United States Patent
Saptharishi et al.

(10) Patent No.: US 10,275,427 B2
(45) Date of Patent: Apr. 30, 2019

(54) SYSTEMS AND METHODS FOR CONTEXTUAL TAGGING OF DATA ON VEHICLE DISPLAY

(71) Applicant: HONEYWELL INTERNATIONAL INC., Morris Plains, NJ (US)

(72) Inventors: Hariharan Saptharishi, Trichy (IN);
Narayanan Srinivasan, Chennai (IN);
Mohan Gowda Chandrashekarappa, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 206 days.

(21) Appl. No.: 15/347,506

(22) Filed: Nov. 9, 2016

(65) Prior Publication Data
US 2018/0129635 A1   May 10, 2018

(51) Int. Cl.
*G06F 3/16* (2006.01)
*G08G 5/00* (2006.01)
(Continued)

(52) U.S. Cl.
CPC ........... *G06F 17/218* (2013.01); *B64D 43/00* (2013.01); *G06F 3/0482* (2013.01);
(Continued)

(58) Field of Classification Search
CPC .. G06F 17/218; G06F 3/04817; G06F 3/0482; G06F 3/167; B64D 43/00; G10L 15/1815; G10L 2015/088
See application file for complete search history.

(56) References Cited

U.S. PATENT DOCUMENTS 6,160,497 A   12/2000   Clark
6,175,314 B1   1/2001   Cobley
(Continued)

FOREIGN PATENT DOCUMENTS

EP   2400273 A2   12/2011
EP   2955707 A2   12/2015

OTHER PUBLICATIONS

Extended EP Search Report for Application No. 17199291.0 dated Apr. 23, 2018.
(Continued)

*Primary Examiner* — Angie M Badawi
(74) *Attorney, Agent, or Firm* — Lorenz & Kopf, LLP

(57) ABSTRACT

A system and method for contextual tagging of data on at least one display associated with a vehicle is provided. The method includes: receiving data regarding the vehicle from at least one of a source of verbal data and a source of non-verbal data; determining a context associated with the data and a variable parameter associated with the context; determining a display element associated with the at least one display that corresponds to the determined variable parameter; generating a symbol for the display to display adjacent to the determined display element based on at least one of the determined context and the determined variable parameter; generating a selectable icon for the display to render adjacent to the symbol based on received verbal data; associating the received verbal data to the selectable icon; and outputting the received verbal data to an audio device based on a selection of the selectable icon.

17 Claims, 11 Drawing Sheets

(51) Int. Cl.
*B64D 43/00* (2006.01)
*G06F 17/21* (2006.01)
*G10L 15/08* (2006.01)
*G10L 15/18* (2013.01)
*G06F 3/0481* (2013.01)
*G06F 3/0482* (2013.01)

(52) U.S. Cl.
CPC .......... *G06F 3/04817* (2013.01); *G06F 3/167* (2013.01); *G08G 5/0013* (2013.01); *G08G 5/0021* (2013.01); *G10L 15/1815* (2013.01); *G10L 2015/088* (2013.01)

(56) References Cited

U.S. PATENT DOCUMENTS

| | | | |
|---|---|---|---|
| 8,164,487 | B1 | 4/2012 | Tsai |
| 8,532,844 | B2 | 9/2013 | Wilson et al. |
| 8,704,701 | B2 | 4/2014 | Pschierer et al. |
| 9,105,183 | B2 | 8/2015 | Samuthirapandian et al. |
| 9,230,549 | B1 | 1/2016 | Popik et al. |
| 9,262,927 | B2 | 2/2016 | Populus et al. |
| 9,848,082 | B1* | 12/2017 | Lillard ................ H04M 3/5141 |
| 2005/0203676 | A1 | 9/2005 | Sandell et al. |
| 2008/0153529 | A1 | 6/2008 | O'Neill et al. |
| 2009/0251542 | A1 | 10/2009 | Cohen et al. |
| 2010/0027768 | A1 | 2/2010 | Foskett |
| 2013/0322634 | A1* | 12/2013 | Bennett ................... G10L 21/00 381/17 |
| 2013/0346081 | A1 | 12/2013 | Loubiere et al. |
| 2014/0025298 | A1* | 1/2014 | Spindler ................ G01C 21/32 701/533 |
| 2015/0162001 | A1* | 6/2015 | Kar ...................... G08G 5/0013 704/235 |
| 2015/0364044 | A1* | 12/2015 | Kashi .................... G08G 5/0095 701/120 |
| 2017/0221369 | A1* | 8/2017 | Bilek ...................... H04W 4/40 |

OTHER PUBLICATIONS

Aslm El-Gharabawy, A.; Graphical NOTAMs—Finally a Reality, AeronavData, 2013.
Laudiu-Mihai Geacar; Reducing Pilot/ATC Communication Errors Using Voice Recognition; 27th International Congress of the Aeronautical Sciences, Faculty of Aerospace Engineering, Politehnica University, 2013.

* cited by examiner

SYSTEMS AND METHODS FOR CONTEXTUAL TAGGING OF DATA ON VEHICLE DISPLAY

TECHNICAL FIELD

The present disclosure generally relates to vehicles, such as aircraft, and more particularly relates to systems and methods for contextual tagging of data, such as verbal and non-verbal communications, on a display associated with the vehicle.

BACKGROUND

Certain vehicles, such as aircraft, are in communication with Air Traffic Control (ATC) throughout the operation of the aircraft. Generally, the ATC sends multiple communications to the aircraft over a voice communication link, and in some instances over a Controller-Pilot Data Link Communications (CPDLC) system. In certain instances, the communication received is for a strategic or downstream action, such as a climb instruction, descend instruction, hold instruction, or a downstream communication instruction, which requires the pilot to remember to perform that action at the downstream location. While the pilot may enter a notation about this instruction on a notepad or electronic notepad, the pilot may misinterpret the instruction and may not remember to perform the instruction in a timely fashion.

Accordingly, it is desirable to provide improved systems and methods for contextual tagging of data on a display of a vehicle, in which verbal and non-verbal communications received from a controller, such as the ATC, are contextually associated with the display of the vehicle. Moreover, it is desirable to provide a selectable icon that enables audio playback of verbal and non-verbal instructions. Furthermore, other desirable features and characteristics of the present invention will become apparent from the subsequent detailed description and the appended claims, taken in conjunction with the accompanying drawings and the foregoing technical field and background.

SUMMARY

According to various embodiments, a system and method for contextual tagging of data on at least one display associated with a vehicle is provided. In one embodiment, the method includes: receiving data regarding the vehicle from at least one of a source of verbal data and a source of non-verbal data; determining, by a processor, a context associated with the data and a variable parameter associated with the context; determining, by the processor, a display element associated with the at least one display that corresponds to the determined variable parameter; generating, by the processor, a symbol for the display to display adjacent to the determined display element based on at least one of the determined context and the determined variable parameter; generating, by the processor, a selectable icon for the display to render adjacent to the symbol based on received verbal data; associating, by the processor, the received verbal data to the selectable icon; and outputting the received verbal data to an audio device based on a selection of the selectable icon.

In one embodiment, a contextual tagging system for contextually tagging data on at least one display associated with a vehicle includes at least one source of verbal data and non-verbal data associated with the vehicle. The contextual tagging system also includes a source of display element data that provides a plurality of display elements associated with the display. The contextual tagging system includes a processor associated with the vehicle, the processor in communication with the source of verbal data and non-verbal data and the source of display element data, and the processor: receives the verbal data and the non-verbal data; determines a context associated with the verbal data and the non-verbal data; determines a variable parameter associated with the context; determines whether at least one of the plurality of display elements is associated with the determined variable parameter; generates a symbol for the display to display adjacent to the determined at least one of the plurality of display elements based on the determined variable parameter; generates a selectable icon for the display to display adjacent to the symbol based on received verbal data; associates the received verbal data to the selectable icon; and outputs the received verbal data to an audio device based on a selection of the selectable icon.

Further provided is an aircraft. The aircraft includes a communication system that receives at least a verbal communication and a display onboard the aircraft that has a plurality of display elements associated with the display. The aircraft includes a processor that contextually tags data on the display, the processor in communication with the communication system and the display, and the processor: receives the verbal communication; determines a context associated with the verbal communication and a variable parameter associated with the context; determines whether at least one of the plurality of display elements is associated with the determined variable parameter; generates a symbol for the display to display adjacent to the determined at least one of the plurality of display elements based on the determined variable parameter; generates a selectable icon for the display to display adjacent to the symbol based on received verbal data; associates the received verbal data to the selectable icon; and outputs the received verbal data to an audio device based on a selection of the selectable icon.

DETAILED DESCRIPTION OF THE DRAWINGS

The exemplary embodiments will hereinafter be described in conjunction with the following drawing figures, wherein like numerals denote like elements, and wherein.

Figure 1:
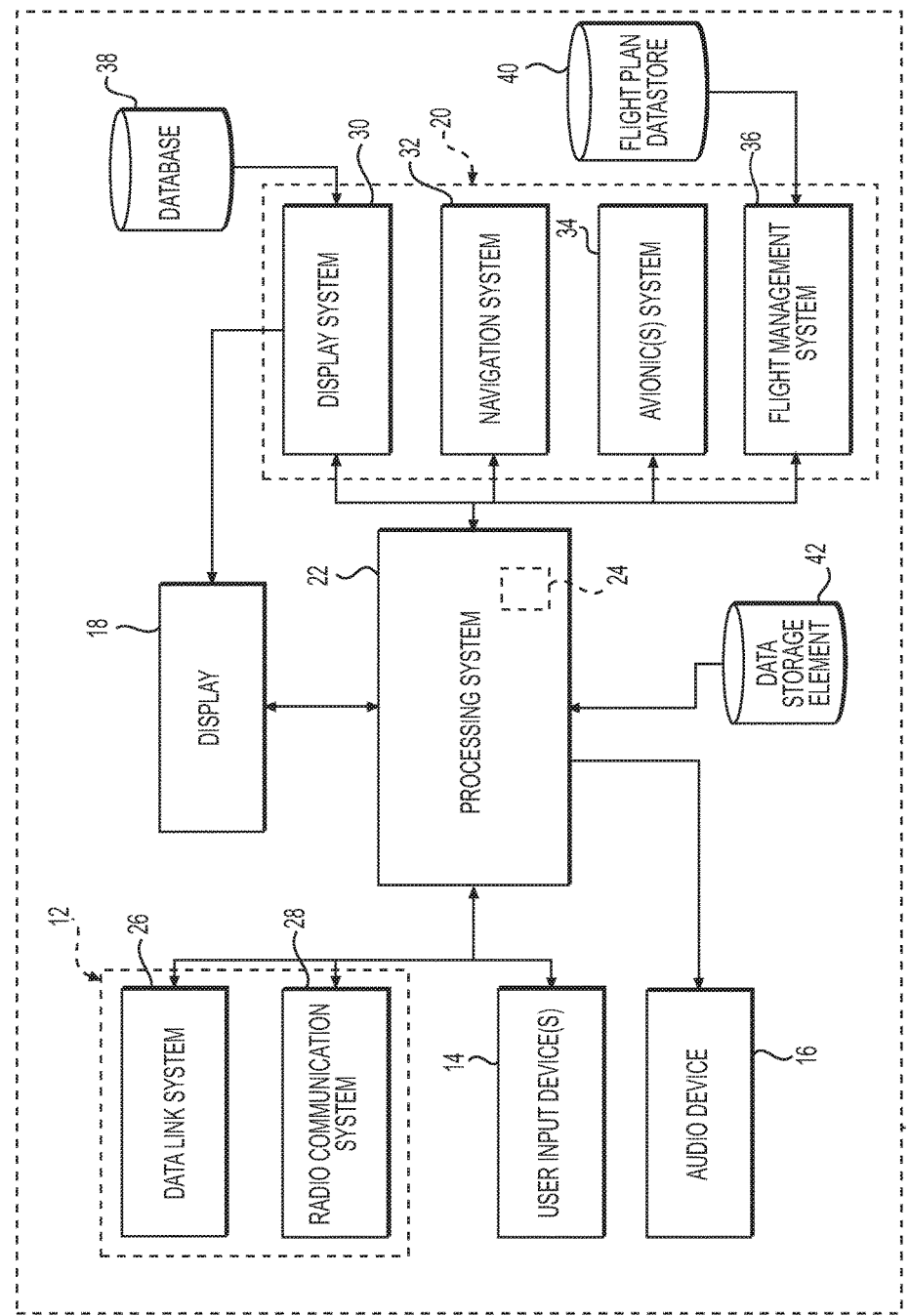
FIG. 1 is a functional block diagram illustrating a vehicle that includes a contextual tagging system for contextually tagging data on a display associated with the vehicle in accordance with various embodiments.
Figure 10:
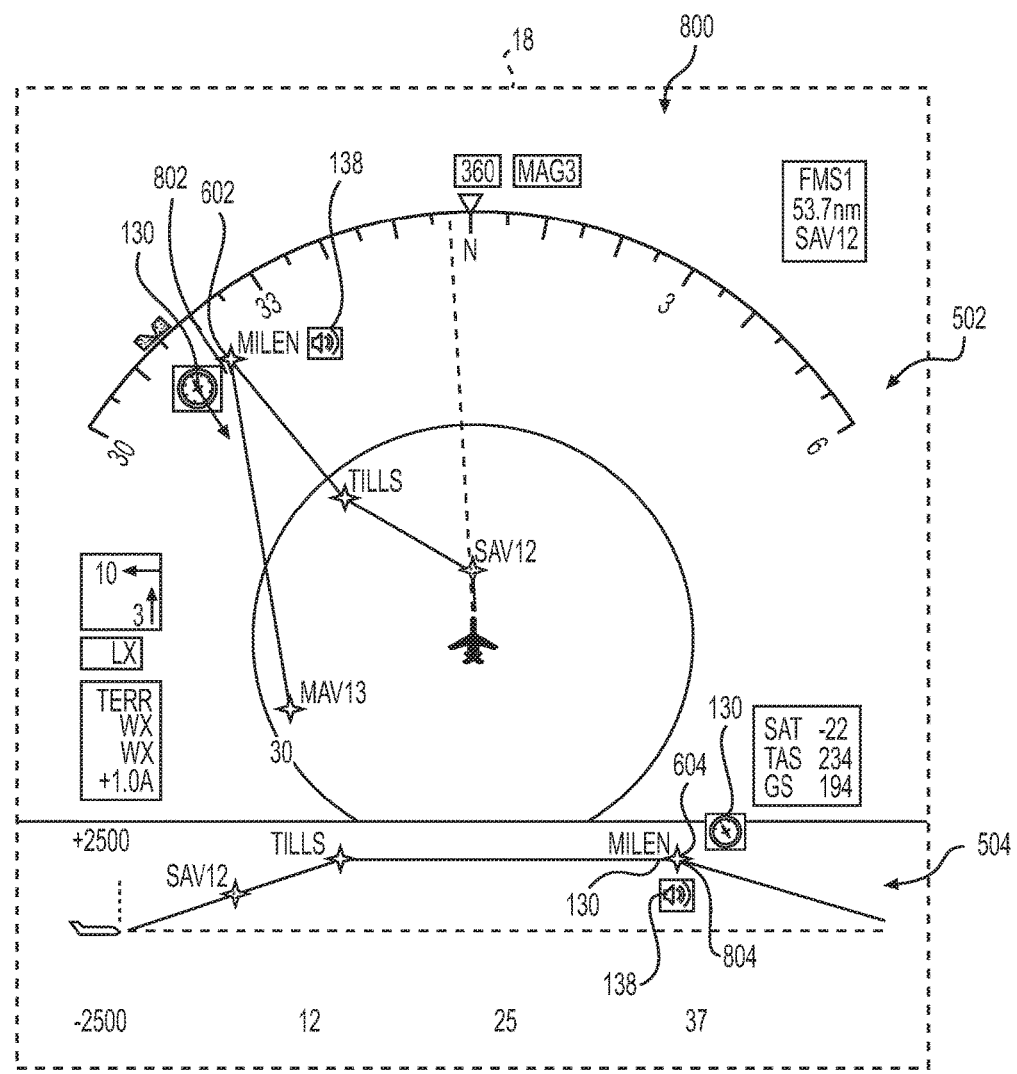
Figure 11:
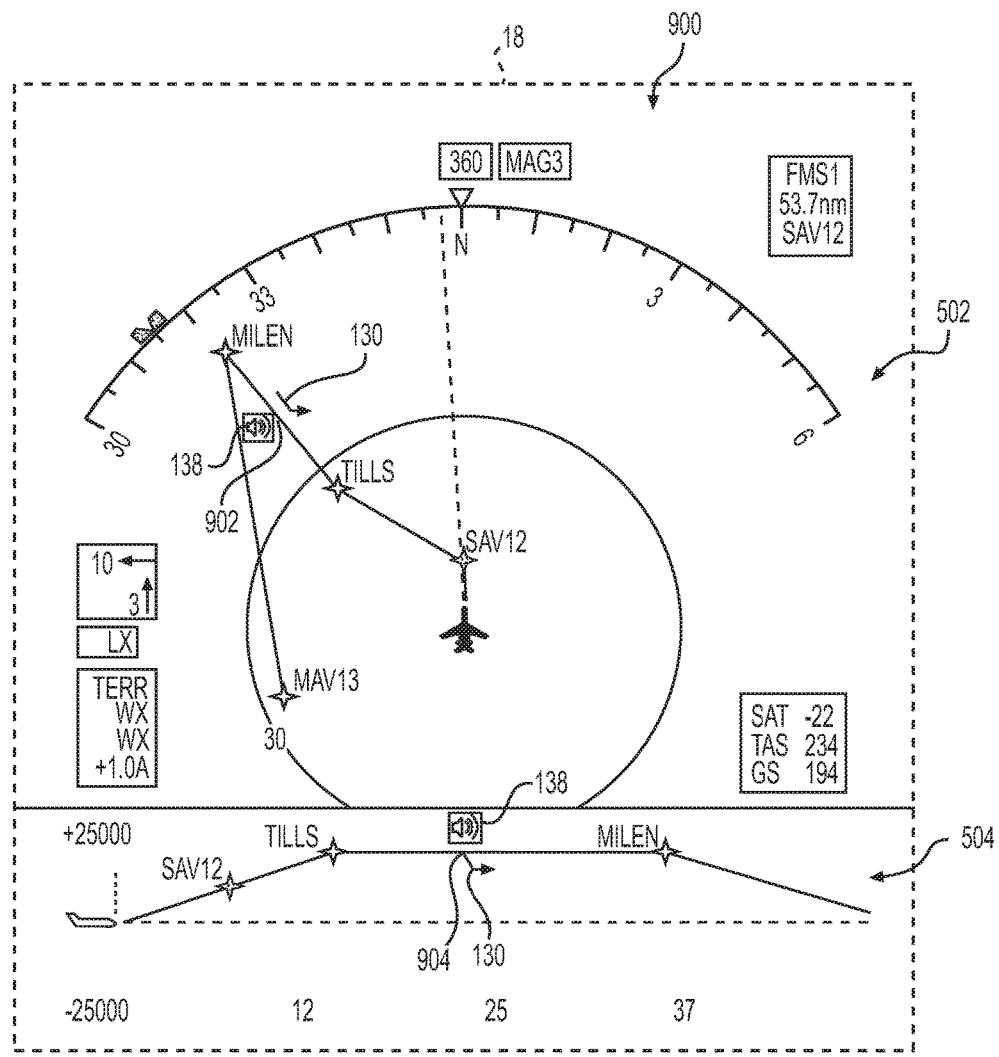

FIG. 10 is an illustration of one exemplary user interface generated by the contextual tagging system of FIG. 1, which displays a symbol and a selectable icon adjacent to a display element on the display of the vehicle based on another exemplary received verbal communication in accordance with various embodiments; and FIG. 11 is an illustration of one exemplary user interface generated by the contextual tagging system of FIG. 1, which displays a symbol and a selectable icon adjacent to a display element on the display of the vehicle based on an exemplary received verbal communication in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any suitable vehicle, such as rotorcraft, automobiles, marine vessels, mobile display system applications, etc., and that the following description regarding an aircraft is merely one exemplary embodiment for contextual tagging of data on a display of the present disclosure. Moreover, the symbology illustrated and described herein are also for exemplary purposes and it should be understood that alternative symbology representations are possible. It should be noted that many alternative or additional functional relationships or physical connections may be present in an embodiment of the present disclosure. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the display system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections are possible in an embodiment of the present disclosure.

With reference to FIG. 1, a vehicle, such as an aircraft 10, is shown. In one example, the aircraft 10 comprises a fixed-wing aircraft; however, the aircraft 10 can comprise any vehicle, such as a rotorcraft, etc. In this example, the aircraft 10 includes a communications system 12, one or more user input devices 14, an audio device 16, a display 18 and one or more aircraft systems 20, which are each in communication with a processing system 22. As will be discussed herein, the processing system 22 includes a contextual tagging control module 24 embedded therein, which processes verbal and non-verbal communication to generate a symbol for display at a point of interest on a display element displayed on the display 18. Stated another way, the contextual tagging control module 24 generates a tag (symbol and selectable icon) that provides a visual indicator to the pilot and/or copilot of a request for pilot action at the point of interest. The contextual tagging control module 24 also processes the non-verbal communication to generate a selectable icon for display at the point of interest, and associates the selectable icon with the non-verbal communication to enable retrieval of the non-verbal communication for audio playback upon selection by a user. The contextual tagging control module 24 processes the verbal communication to generate a selectable icon for display at the point of interest, and associates the selectable icon with the verbal communication to enable retrieval of the verbal communication for audio playback upon selection by a user. By processing the verbal and non-verbal communication and symbolically illustrating the communication on the display, the pilot's workload is reduced and the possibility of misinterpreting the instruction is also reduced. Moreover, by providing the selectable icon, the pilot can select to re-hear the non-verbal or verbal communication, thereby reducing misinterpretations. As used herein "context" denotes a pilot action in the operation of the aircraft 10 that is received as a requested pilot action in an instruction from a controller, such as Air Traffic Control (ATC). Although the figures shown herein depict an example with certain arrangements of elements, additional intervening elements, devices, features, or components may be present in an actual embodiment. It should also be understood that FIG. 1 is merely illustrative and may not be drawn to scale.

In one example, the communications system 12 includes a data link system 26 and a radio communication system 28. It should be noted that the communications system 12 is merely an example, and the communications system 12 associated with the aircraft 10 can include various other communications systems that enable the aircraft 10 to communicate with Air Traffic Control (ATC), Airline Operations Center (AOC), other aircraft, an external monitoring system, command center, ground location, etc. In this example, the data link system 26 is a Controller-Pilot Data Link Communications (CPDLC) system, which enables air-ground data communication between ATC and the aircraft 10. Thus, the data link system 26 enables data communications to the aircraft 10 from the ATC, and enables data communications from the aircraft 10 to the ATC over a communications network. Generally, the communications received by the aircraft 10 via the data link system 26 comprise non-verbal communications. Exemplary non-verbal communications received include level assignments, crossing constraints, lateral offsets, route changes and clearances, speed assignments, radio frequency assignments and various requests for information. The non-verbal communications received from the data link system 26 are communicated to the processing system 22 over a suitable communication architecture that facilitates the transfer of data, power, commands, etc., such as a bus associated with the aircraft 10.

The radio communication system 28 is a radio transceiver, such as an high frequency (HF) radio transceiver, a very high frequency (VHF) radio transceiver, ultra high frequency (UHF) radio transceiver and combinations thereof. The radio communication system 28 enables verbal communication between ATC, other aircraft, an external monitoring system, command center, ground location, etc. and the aircraft 10. The verbal communications received from the radio communication system 28 are communicated to the processing system 22 over a suitable communication architecture that facilitates the transfer of data, power, commands, etc., such as a bus associated with the aircraft 10.

The one or more user input devices 14 enable a user (e.g, the pilot, copilot or other crew member) to interact with the aircraft 10, including the display 18 and the processing system 22. The user input device 14 may be implemented as a keyboard (not separately shown), a microphone (not separately shown), a touchscreen layer associated with the display 18, a touch pen, a number pad, a mouse, a touchpad, a roller ball, a pushbutton, a switch, a joystick, a knob, a digital notepad or other suitable device to receive data and/or commands from the user. Of course, multiple input devices 14 can also be utilized. In one example, one of the user input devices 14 is a digital notepad or scratch pad that enables the user to write notes or enter non-verbal communications, which are communicated to the processing system 22. It should be noted that the use of a digital notepad is merely exemplary, as any suitable input device may be employed by the user to enter non-verbal communications, which are communicated from the user input device 14 to the processing system 22. In a further example, one of the user input devices 14 is a touchscreen layer associated with the display 18 such that the user may touch an icon displayed on the display 18 and the user input received by the touchscreen layer is communicated to the processing system 22. In another example, one of the user input devices 14 is a mouse that controls a cursor on the display 18 such that the user may move the mouse so that the cursor is positioned on an icon displayed on the display 18 and a button associated with the mouse may be used to select the icon, with the selection of the icon by the user via the mouse communicated to the processing system 22. The input received from the user input device 14 is communicated to the processing system 22 over a suitable communication architecture that facilitates the transfer of data, power, commands, etc., such as a bus associated with the aircraft 10.

The audio device 16 receives one or more audio signals from the processing system 22, and converts the audio signals into sound. In one example, the audio device 16 is a speaker which is positioned within a cockpit of the aircraft 10 to be heard by the pilot and/or co-pilot. The audio device 16 may comprise any suitable speaker, such as a speaker associated with a headset worn by the pilot and/or co-pilot, a speaker provided in a cockpit instrument panel associated with the aircraft 10, etc. The audio device is in communication with the processing system 22 over a suitable communication architecture that facilitates the transfer of data, power, commands, etc., such as a bus associated with the aircraft 10.

In this example, the display 18 is associated with and is onboard the aircraft 10. It will be understood, however, that in other embodiments a display associated with a vehicle may be remote from the vehicle, such as, for example a display associated with unmanned vehicles (Aerial, Water, Ground, etc.) that are remotely piloted or monitored remotely from outside of the vehicle. The display 18 is in communication with the contextual tagging control module 24 of the processing system 22 to display one or more symbols and selectable icons in a graphical format to inform the pilot and/or copilot of the context of a received verbal and/or non-verbal communication, as will be discussed in greater detail herein. While a single display 18 is illustrated in FIG. 1, it will be understood that the display 18 can include any number of displays that are viewable by occupants of the aircraft 10, including the pilot, copilot, controllers and/or non-cockpit (cabin) occupant displays. The display 18 comprises any suitable technology for displaying information, including, but not limited to, a liquid crystal display (LCD), organic light emitting diode (OLED), plasma, or a cathode ray tube (CRT). In this example, the display 18 is an electronic display capable of graphically displaying the one or more symbols and selectable icons superimposed over flight information or other data associated with the operation of the aircraft 10 under the control of the processing system 22 and a display system 30 of the aircraft systems 20. In this regard, the display 18 is coupled to the processing system 22 and the display system 30, and the processing system 22 and the display system 30 cooperate to display, render and otherwise convey one or more graphical and/or textual representations or images associated with the operation of the aircraft 10, along with the one or more symbols and the selectable icons superimposed over a respective one of the one or more graphical and/or textual representations or images associated with the operation of the aircraft 10.

In one example, the one or more aircraft systems 20 include the display system 30, a navigation system 32, an avionics system 34 and a flight management system 36. The display system 30 generally represents the hardware, firmware, processing logic and/or other components configured to control the display and/or rendering of one or more displays pertaining to operation of the aircraft 10 and/or systems 26, 32, 34, 36 on the display 18 (e.g., synthetic vision displays, navigational maps, and the like). In this regard, the display system 30 may access or include one or more databases 38 suitably configured to support operations of the display system 30, such as, for example, a terrain database, an obstacle database, a navigational database, a geopolitical database, a terminal airspace database, a special use airspace database, or other information for rendering and/or displaying navigational maps and/or other content on the display 18. In this regard, in addition to including a graphical representation of terrain, a navigational map displayed on the display 18 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. As will be discussed below, the processing system 22 generates the one or more symbols and/or selectable icons and a point of interest for each of the symbols and selectable icons on the display, and the processing system 22 outputs the generated symbols and selectable icons for the display 18 to be superimposed on the navigational maps and/or other content rendered on the display 18 at the point of interest. The display system 30 is in communication with the processing system 22 and the display 18 over a suitable communication architecture that facilitates the transfer of data, commands, power, such as a bus, associated with the aircraft 10.

The flight management system 36 is communicatively coupled to the navigation system 32, the communications system 12, the avionics system 34 and the processing system 22 to support navigation, flight planning, and other aircraft control functions in a conventional manner, as well as to provide real-time data and/or information regarding the operational status of the aircraft 10 to the processing system 22. Briefly, the navigation system 32 provides substantially real-time navigational data regarding the operation of the aircraft 10. In this example, the navigation system 32 includes at least a positioning system, which provides a current position of the aircraft 10. Generally, the navigation system 32 includes one or more position sensors, such as radio aids, a global positioning system (GPS), scanning distance measuring equipment, VHF omnidirectional radio range (VORs) or long range aid to navigation (LORAN), inertial reference systems (IRS). The navigation system 32 may integrate the positions obtained from the one or more position sensors and determine a single position of the aircraft 10 (e.g. latitude, longitude, altitude, heading) and a corresponding accuracy of the position.

The avionics system 34 obtains and provides real-time flight related information to the processing system 22, which can be displayed on the display 18 by the display system 30 and/or otherwise communicated to the pilot, co-pilot and/or a crew member. Generally, the avionics system 34 may include multiple avionics systems, such as a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. Thus, the avionics system 34 support navigation, flight planning and control functions of the aircraft 10 in a conventional manner.

The flight management system 36 manages a flight plan associated with the aircraft 10 while in-flight. In one example, the flight management system 36 receives the flight plan data from the communications system 12 and stores the flight plan data in a flight plan datastore 40 onboard the aircraft 10. Generally, the flight plan data comprises the planned or target flight path for the aircraft 10, from take-off to landing, which can include a selected flight plan for take-off, a selected flight plan for level or cruising flight, a selected flight plan for approach to landing, and so on. For each of the selected flight plans, the selected flight plan can be broken down into segments or legs. In one example, the approach for the aircraft 10 can have two or more legs, separated by one or more waypoints, which define the approach.

The flight plan datastore 40 stores the information required for managing the flight plan, as is known in the art. The flight plan datastore 40 can be defined in the ARINC 424 standard. The flight plan datastore 40 stores, for example, waypoints/intersections, airways, radio navigations aids, airports, runways, standard instrument departure data, standard terminal arrival data, holding patterns and instrument approach procedures. The flight plan datastore 40 also stores the defined legs of each of the flight plans, along with distance data in nautical miles for the flight plan. The flight plan datastore 40 can also store one or more lateral and vertical profiles associated with each of the defined legs of each of the flight plans. Generally, the vertical profile comprises an altitude range, speed, flight path angle, etc. for the aircraft 10 for the particular leg of the flight plan. Generally, the lateral profile comprises the inbound segments for the flight plan leg and the associated entry and exit transition trajectories between the flight plan legs.

The processing system 22 generally represents the hardware, circuitry, processing logic, and/or other components configured to facilitate communications and/or interaction between the elements of the aircraft 10 and perform additional processes, tasks and/or functions to support operation of the aircraft 10, as described in greater detail below. Depending on the embodiment, the processing system 22 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 22 includes processing logic that may be configured to carry out the functions, techniques, and processing tasks associated with the operation of the aircraft 10 described in greater detail below. Furthermore, the steps of a method or algorithm described in connection with the embodiments disclosed herein may be embodied directly in hardware, in firmware, in a software module executed by the processing system 22, or in any practical combination thereof. In accordance with one or more embodiments, the processing system 22 includes or otherwise accesses a data storage element 42, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 22, cause the processing system 22 to execute and perform one or more of the processes, tasks, operations, and/or functions described herein.

The contextual tagging control module 24 is embedded within the processing system 22. The contextual tagging control module 24 receives as input the verbal communications from the radio communication system 28, the non-verbal communications from the data link system 26 and the non-verbal communications received from at least one of the user input devices 14. It should be noted that the contextual tagging control module 24 may also receive non-verbal and/or verbal communications from any other source associated with or in communication with the aircraft 10. Based on the received verbal communications, the contextual tagging control module 24 determines a pattern associated with the verbal communication, and compares the pattern to keywords to extract a context and a variable parameter. The contextual tagging control module 24 determines based on the variable parameter, a display element associated with the verbal communication. The contextual tagging control module 24 also determines a symbol associated with at least one of the context and the variable parameter. The contextual tagging control module 24 also determines a point of interest on the display for the display of the symbol based on at least one of the context and the variable parameter. The contextual tagging control module 24 also associates the verbal communication with a selectable icon, and outputs the symbol and the selectable icon, along with the point of interest for the symbol and the selectable icon on the display 18 to be superimposed over the navigational maps and/or other content rendered by the display system 30 on the display 18. The contextual tagging control module 24 also outputs audio signals based on a selection of the selectable icon by the one of the user input devices 14.

Based on the received non-verbal communications, the contextual tagging control module 24 determines keywords associated with the non-verbal communication, and extracts a context and a variable parameter based on the determined keywords. The contextual tagging control module 24 determines based on the variable parameter, a display element associated with the non-verbal communication. The contextual tagging control module 24 also determines a symbol associated with at least one of the context and the variable parameter. The contextual tagging control module 24 also determines a point of interest on the display for the display of the symbol based on at least one of the context and the variable parameter. The contextual tagging control module 24 also associates the non-verbal communication with a selectable icon, and outputs the symbol and the selectable icon, along with the point of interest for the symbol and the selectable icon on the display 18 to be superimposed over the navigational maps and/or other content rendered by the display system 30 on the display 18. The contextual tagging control module 24 also outputs audio signals based on a selection of the selectable icon by the one of the user input devices 14.

Figure 2:
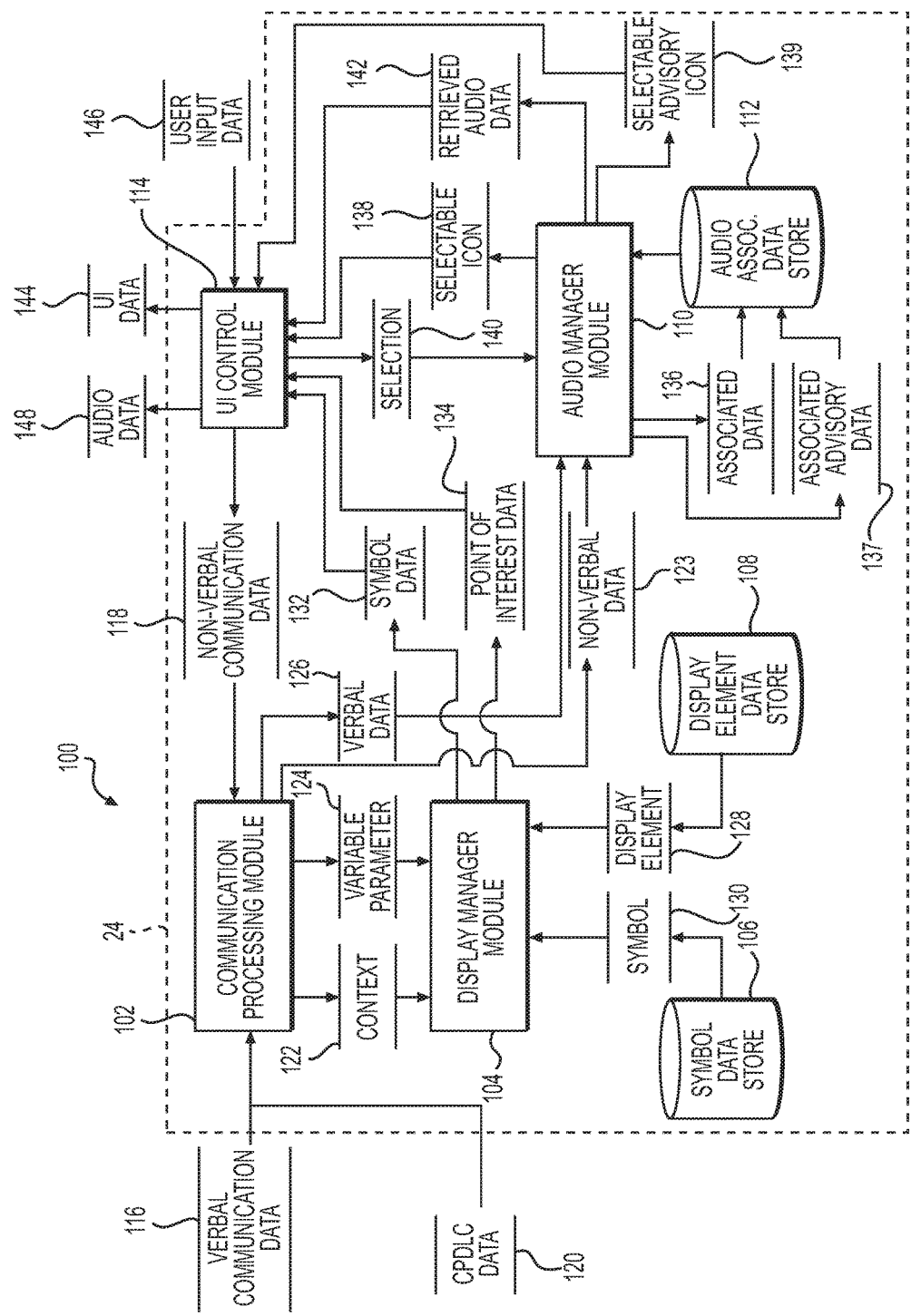
FIG. 2 is a dataflow diagram illustrating a control system of the contextual tagging system of FIG. 1 in accordance with various embodiments.

Referring now to FIG. 2, and with continued reference to FIG. 1, a dataflow diagram illustrates various embodiments of a control system 100 for the aircraft 10 for the display of a symbol and selectable icon superimposed over a display element on the display 18 based on received verbal or non-verbal communications, which may be embedded in the contextual tagging control module 24 of the processing system 22. Various embodiments of the control system 100 according to the present disclosure can include any number of sub-modules embedded within the contextual tagging control module 24. As can be appreciated, the sub-modules shown in FIG. 2 may be combined and/or further partitioned to similarly display a symbol and selectable icon superimposed over a display element based on received verbal or non-verbal communications on the display 18. Inputs to the control system 100 may be received from one or more of the user input devices 14 (FIG. 1), received from the communications system 12 (FIG. 1), received from other control modules (not shown), and/or determined/modeled by other sub-modules (not shown) within the contextual tagging control module 24. In various embodiments, the contextual tagging control module 24 includes a communication processing module 102, a display manager module 104, a symbol datastore 106, a display element datastore 108, an audio manager module 110, an audio associations datastore 112 and a user interface (UI) control module 114.

The communication processing module 102 receives as input verbal communication data 116, non-verbal communication data 118 and CPDLC data 120. Based on the verbal communication data 116, the non-verbal communication data 118 and the CPDLC data 120, the communication processing module 102 determines a context 122 and a variable parameter 124, and sets the context 122 and the variable parameter 124 for the display manager module 104.

The communication processing module 102 also sets verbal data 126 for the audio manager module 110.

Figure 3:
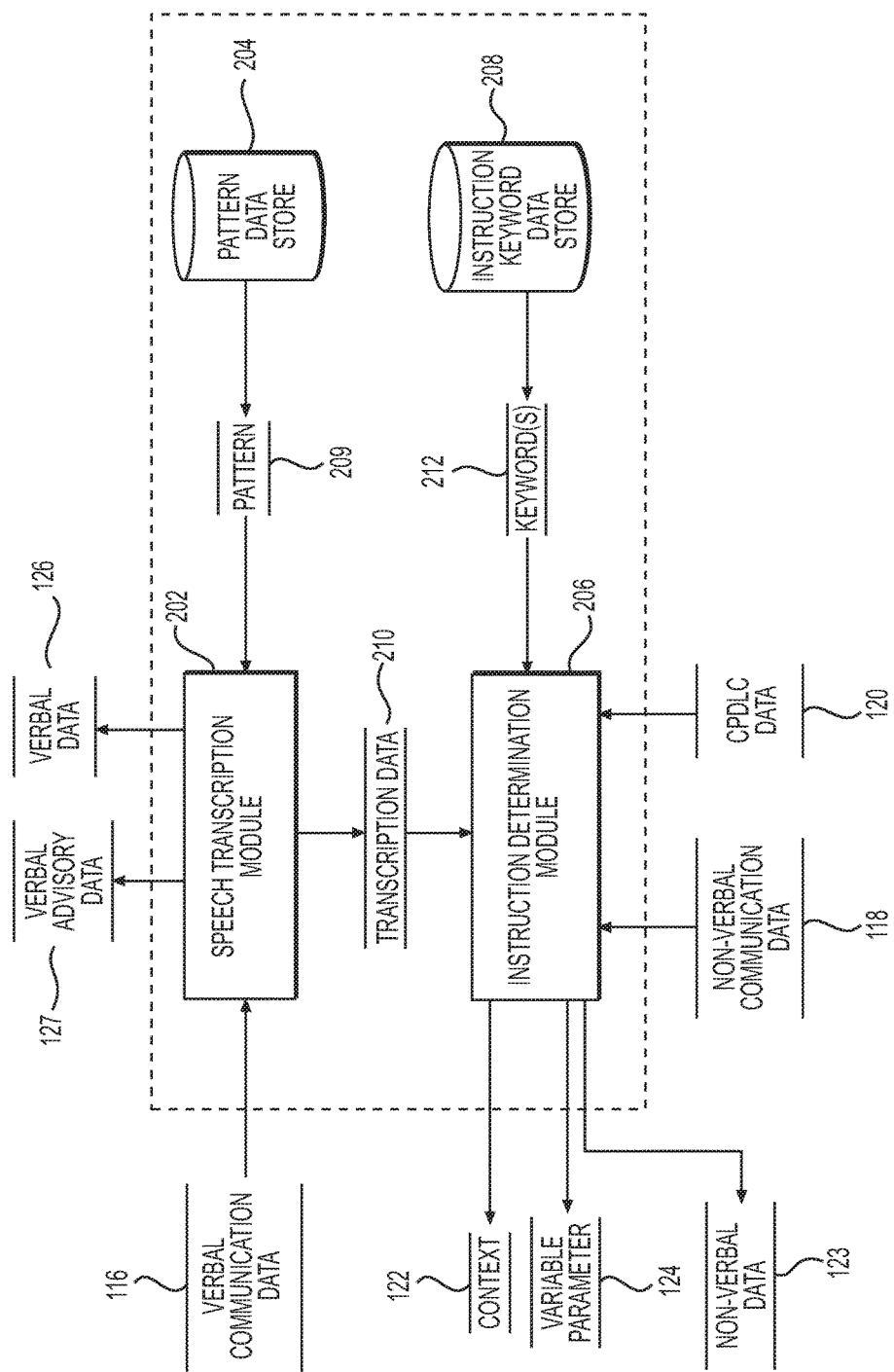
FIG. 3 is a dataflow diagram illustrating a communication processing system of a communication processing module of FIG. 2 in accordance with various embodiments.

Referring now to FIG. 3, and with continued reference to FIGS. 1 and 2, a dataflow diagram illustrates various embodiments of a communication processing system 200 for the aircraft 10, which may be embedded in the communication processing module 102. Various embodiments of the communication processing system 200 according to the present disclosure can include any number of sub-modules embedded within the communication processing module 102. As can be appreciated, the sub-modules shown in FIG. 3 may be combined and/or further partitioned to similarly determine a context and a variable parameter from a received verbal, non-verbal or CPDLC communication. Inputs to the communication processing system 200 may be received from one of the user input devices 14 (FIG. 1), received from the communications system 12 (FIG. 1), received from other control modules (not shown), and/or determined/modeled by other sub-modules (not shown) within the communication processing module 102. In various embodiments, the communication processing module 102 includes a speech transcription module 202, a pattern datastore 204, an instruction determination module 206 and an instruction keyword datastore 208. While the pattern datastore 204 and the instruction keyword datastore 208 are illustrated herein as being onboard the aircraft 10, it will be understood that one or more of the pattern datastore 204 and the instruction keyword datastore 208 may reside on a remote server accessible via a communication channel associated with the communications system 12.

In one example, the pattern datastore 204 stores one or more patterns 209 of instruction words and value words, such as the pattern of instruction words and value words used between air traffic control officers of ATC and the pilot and/or co-pilot. Generally, a sequence of messages between the aircraft 10 and the ATC relating to a particular transaction (for example a request for pilot action and acknowledgment of the request) is termed a "dialog." There can be several sequences of messages in the dialog, each of which is closed by means of appropriate messages, usually of acknowledgement or acceptance. Each dialog relates to the request for pilot action communicated in the (initial) inbound voice communication. For example, the air traffic controller (ATCO) at the transmitting station of the ATC is provided with the capability to communicate level assignments, crossing constraints, lateral offsets, route changes and clearances, speed assignments, radio frequency assignments, various requests for information, etc. (each collectively referred to herein as an exemplary "request(s) for pilot action."), which are acknowledged by the pilot and/or copilot. Typically, each of the dialogues employs a pattern of words and phrases. This pattern of words and phrases is generally a combination of one or more of an instruction word (request, unable, line up, wait, above you, no factor, accelerate), and a value word (Skyhawk 9130, 1 o'clock, 10 miles, 2000 FT).

The patterns 209 stored in the pattern datastore 204 each include an instruction word and an associated value word that are a part of an aviation vocabulary, such as words and phrases corresponding to instructions or commands received from the ATC and a value word (e.g., report crossing altitude FL200, descent 2000 feet, etc.). The pattern datastore 204 can also store patterns comprised of instruction words and value words obtained from the flight management system 36, the database 38 and/or the data storage element 42. Thus, the pattern 209 retrieved from the pattern datastore 204 includes one or more instruction words and an associated value word, based on words and phrases that are part of the aviation vocabulary, obtained from the flight management system 36, the database 38 and/or the data storage element 42. In addition, the pattern datastore 204 may be loaded with patterns of instruction words and value words, based on words and phrases that are filtered from a global generic database, and correspond to elements associated with a specific aircraft, particular flight plan or flight transition regions (regional accents and vocabulary), etc. to enhance processing accuracy and speed. Thus, the pattern datastore 204 may store patterns of instruction words and value words that are specific to the particular aircraft 10, and/or specific to the particular flight plan for the aircraft 10. Stated another way, the pattern datastore 204 may store patterns that match with the current context of flight information retrieved from flight management system 36, the database 38, the data storage element 42 and/or other systems from aircraft 10, and which are validated for applicability of the instruction to the aircraft 10. Further, the pattern datastore 209 may store all possible combinations of instructions words with value words for determining a pattern. The patterns 209 may be stored in a tabular format, with each instruction word associated with a corresponding value word.

The speech transcription module 202 receives as input the verbal communication data 116. The verbal communication data 116 is one or more verbal communications received via the radio communication system 28 (FIG. 1). For example, the verbal communication data 116 comprises one or more verbal instructions received from an air traffic controller of the ATC, such as a request for pilot action or an advisory message. Based on the received verbal communication data 116, the speech transcription module 202 queries the pattern datastore 204 to identify the pattern 209 of the verbal communication data 116. Based on the identification of the pattern 209, the speech transcription module 202 determines whether the verbal communication is a request for pilot action or is an advisory for informing the pilot of a particular event. Stated another way, based on the identification of the pattern 209 of one or more instruction words and value words, the speech transcription module 202 determines that the verbal communication is a request for pilot action. The speech transcription module 202 sets the determined request for pilot action as verbal data 126 for the audio manager module 110 (FIG. 2).

If the speech transcription module 202 is unable to determine a pattern 209 that matches the verbal communication, the speech transcription module 202 determines that the verbal communication is an advisory message. In other words, if the speech transcription module 202 queries the pattern datastore 209 and is unable to retrieve a pattern associated with the verbal communication data 116 (e.g. the verbal communication data 116 does not include an instruction word), the speech transcription module 202 determines the verbal communication data 116 is an advisory message. The speech transcription module 202 sets the determined advisory message as verbal advisory data 127 for the audio manager module 110 (FIG. 2).

In addition, based on the determination of the request for pilot action, the speech transcription module 202 transcribes the initial communication or request for pilot action into text in a conventional manner, and sets this as transcription data 210 for the instruction determination module 206. The transcription performed by the speech transcription module 202 may also include the identification of pauses and full stops in the verbal communication data 116 such that only the specific request for pilot action received is transcribed. In various embodiments, the speech transcription module 202 uses a hidden Markov model based approach to speech recognition. In other embodiments, the speech transcription module 202 is trained to recognize keywords of the one or more instruction words and associated value words in the patterns 209 of the pattern datastore 204, and converts the determined request for pilot action from the verbal communication data 116 into text based on the identification of the learned keywords. It should be noted that the speech transcription module 202 may employ any suitable speech recognition technique to convert the determined request for pilot action from the verbal communication data 116 into text.

The instruction keyword datastore 208 stores one or more keywords 212 associated with the operation of the aircraft 10. In various embodiments, the instruction keyword datastore 208 stores words that are a part of an aviation vocabulary, such as words corresponding to the call sign, words corresponding to commands received from the ATC, and words obtained from the flight management system 36, the database 38 and/or the data storage element 42. Generally, the instruction keyword datastore 208 stores keywords and keyword phrases associated with a variety of contexts related to the operation of the aircraft 10, such as a heading, an altitude, attitude, flight level, QNH, etc., and a variable parameter associated with the context. For example, the instruction keyword datastore 208 can store keywords and keyword phrases that provide a context associated with acceptable parameters for the context in a look-up table. The look-up table can be indexed by context keyword or context keyword phrase, to provide the parameter keyword. As used herein "context" denotes a pilot action in the operation of the aircraft 10 that is received as the requested pilot action in the instruction from ATC. Exemplary context keywords and keyword phrases include: "climb," "descent," "vector," "report," "taxi," "speed limit," "maintain altitude level," "tune," "contact," "accelerate," etc. As used herein "parameter" denotes a value for the request for pilot action, which is variable. Exemplary parameter keywords include altitude levels (e.g. feet), waypoints, flight levels (e.g. FL200), time, runways ("three two right"), etc. Thus, the context provides the setting for the requested pilot action, and the parameter provides the value for the pilot action.

The instruction determination module 206 receives as input the transcription data 210. Based on the transcription data 210, the instruction determination module 206 queries the instruction keyword datastore 208 and determines whether any of the text in the transcription data 210 corresponds to or matches keywords 212 listed in the instruction keyword datastore 208. Based on a match, the instruction keyword datastore 208 determines the context 122 and the variable parameter 124 associated with the transcription data 210. The context 122 is the setting for the requested pilot action, and the variable parameter 124 is the value for the pilot action. The instruction determination module 206 sets the context 122 and the variable parameter 124 for the display manager module 104 (FIG. 1).

The instruction determination module 206 also receives as input the non-verbal communication data 118 from the UI control module 114 (FIG. 1) and the CPDLC data 120. The non-verbal communication data 118 is text received via the user input device 14, such as one or more textual notations received from the digital notepad. The CPDLC data 120 is text received from the data link system 26 that requests pilot action. Based on the received non-verbal communication data 118 or the received CPDLC data 120, the instruction determination module 206 queries the instruction keyword datastore 208 and determines whether any of the text in the non-verbal communication data 118 or the CPDLC data 120 corresponds to or matches keywords 212 listed in the instruction keyword datastore 208. Based on a match, the instruction keyword datastore 208 determines the context 122 and the variable parameter 124 associated with the non-verbal communication data 118 and/or CPDLC data 120. The instruction determination module 206 sets the context 122 and the variable parameter 124 for the display manager module 104 (FIG. 1).

In addition, based on the received non-verbal communication data 118 or the received CPDLC data 120, the instruction determination module 206 sets non-verbal data 123 for the audio manager module 110. The non-verbal data 123 is the text received from the user input device 14 or the text received from the data link system 26.

The display element datastore 108 stores a listing of display elements 128 currently being displayed on the display 18. The display element datastore 108 may be populated by the processing system 22 and/or the display system 30 in substantially real-time. Generally, as used herein, a "display element" denotes an item of information rendered on the display 18. Exemplary display elements 128 include waypoints, flight leg segments and other navigational aids, vertical trajectories, altitude levels, air traffic controllers along flight route, alternate airports, crossing points (oceanic, latitude, longitude), runways, taxiways, etc. In various embodiments, the display element datastore 108 stores a listing of display elements 128 that are associated with vertical situation displays, horizontal situation displays, interactive navigation displays, primary flight displays and/or other vehicle displays, including, but not limited to, Mobile Electronic Flight Bag (EFB) displays, etc.

The symbol datastore 106 stores one or more symbols 130, which correspond to at least one of the context 122 and the variable parameter 124. The symbol datastore 106 can store the symbols 130 in a tabular format, or in a list. Generally, the symbols 130 are factory defined values. Each of the symbols 130 are graphical representations for display on the display 18 based on the context 122 and/or the variable parameter 124. For example, if the context 122 is a climb instruction, the corresponding symbol 130 is a slanted upward pointing arrow. As a further example, if the context 122 is a report instruction, the corresponding symbol 130 is an air traffic control tower symbol. In another example, if the context is a descend instruction, the corresponding symbol 130 is a downward pointing arrow. In another further example, if the context 122 is a vector instruction, the corresponding symbol 130 is a circle with radials with an extended radial arrow symbol. Generally, the symbols provide visual or graphical cues for the pilot as to the nature of the instruction associated with the point of interest.

With reference back to FIG. 2, the display manager module 104 receives as input the context 122 and the variable parameter 124. Based on the variable parameter 124, the display manager module 104 queries the display element datastore 108 and retrieves the display element 128 associated with the display 18 that corresponds to the determined variable parameter 124. For example, if the variable parameter 124 an altitude level at a specified downpath waypoint, the display manager module 104 queries the display element datastore 108 to determine the waypoint display element and whether an altitude level display element is currently being displayed on the display 18.

If the display manager module 104 determines the variable parameter 124 corresponds with one or more of the display elements 128, the display manager module 104 queries the symbol datastore 106 and retrieves the symbol 130 that corresponds to the context 122 and/or the variable parameter 124. The display manager module 104 sets the retrieved symbol 130 as symbol data 132 for the UI control module 114.

The display manager module 104 also determines a point of interest for the display of the retrieved symbol 130 on the display 18 adjacent to or on the corresponding display element 128. In one example, the display manager module 104 determines the point of interest based on the variable parameter 124. In this regard, the display manager module 104 determines the value of the variable parameter 124, and sets the point of interest as this value. For example, if the retrieved display element 128 is a vertical trajectory (based on the context 122 of a descent or climb instruction), and the variable parameter 124 is an altitude level, such as 2000 feet (ft), the display manager module 104 sets point of interest data 134 as 2000 ft on the vertical trajectory displayed on the display 18. Thus, the point of interest data 134 is a position on or adjacent to a display element of the display 18 for the symbol 130 that corresponds to verbal or non-verbal communication received. In some embodiments, the display manager module 104 may determine a coordinate location for the symbol 130 based on the variable parameter 124 and the display element 128, and set this coordinate location as the point of interest data 134. The display manager module 104 sets the point of interest data 134 for the UI control module 114. In addition, the point of interest or the pseudo point of interest may be adjacent to the display element of the display 18 so as to not obscure the display element.

In certain instances, the display manager module 104 is unable to determine an exact point of interest based on the verbal or non-verbal communication received. In these instances, the display manager module 104 computes a pseudo point of interest along the flight route at a specific distance and time based on the variable parameter 124 and the retrieved display element 128. The display manager module 104 sets the computed pseudo point of interest as the point of interest data 134 for the UI control module 114.

The audio manager module 110 receives as input the non-verbal data 123 and the verbal data 126. The audio manager module 110 associates the received verbal data 126 with a particular selectable icon 138, and stores this as associated data 136 in the audio associations datastore 112. The audio manager module 110 also associates the received non-verbal data 123 with a particular selectable icon 138, and stores this as associated data 136 in the audio associations datastore 112. The audio manager module 110 sets the selectable icon 138 for the UI control module 114, which is associated with the received non-verbal data 123 or the received verbal data 126. In one example, the selectable icon 138 is a symbol of a speaker; however, any suitable icon could be used to denote the selection of audio playback of the non-verbal data 123 or verbal data 126. Alternatively, the symbol 130 itself may be used to denote the selection of audio playback of the non-verbal data 123 or verbal data 126.

The audio manager module 110 receives as input the advisory verbal data 127. The audio manager module 110 associates the received advisory verbal data 127 with a particular selectable advisory icon 139, and stores this as associated advisory data 137 in the audio associations datastore 112. The audio manager module 110 sets the selectable advisory icon 139 for the UI control module 114, which is associated with the received advisory verbal data 127. In one example, the selectable advisory icon 139 is a symbol of a speaker; however, any suitable icon could be used to denote the selection of audio playback of the advisory verbal data 127.

The audio manager module 110 also receives as input a selection 140. The selection 140 comprises input received via the user input device 14 to select a particular selectable icon 138 or selectable advisory icon 139 displayed on the display 18. Based on the selection 140, the audio manager module 110 queries the audio associations datastore 112 and retrieves the non-verbal data 123, verbal data 126 or advisory verbal data 127 associated with the selection 140. The audio manager module 110 sets retrieved audio data 142 for the UI control module 114. The retrieved audio data 142 comprises the non-verbal data 123, the verbal data 126 or advisory verbal data 127 retrieved from the audio associations datastore 112 that is associated with the selectable icon 138 or selectable advisory icon 139 identified via the selection 140.

The UI control module 114 receives as input the symbol data 132 and the point of interest data 134. The UI control module 114 also receives as input the selectable icon 138 and the selectable advisory icon 139. The UI control module 114 associates the received selectable icon 138 with the received symbol data 132 and the point of interest data 134, and sets this data as user interface (UI) data 144 for the display 18. By associating the received selectable icon 138 with the received symbol data 132 and point of interest data 134, the selectable icon 138 is output for display on the display 18 adjacent to the symbol 130 at the determined point of interest. The UI control module 114 also sets the received selectable advisory icon 139 along with a default point of interest for rendering on the display 18 as user interface (UI) data 144 for the display 18. Generally, the selectable advisory icon 139 is rendered on the display 18 at a default or pre-defined location to enable the selection of audio playback of the advisory verbal data 127.

The UI control module 114 also receives user input data 146. The user input data 146 is input received from one or more of the user input devices 14. The UI control module 114 processes the user input data 146 and determines whether the user input data 146 is a selection of one of the selectable icons 138 or selectable advisory icon 139 displayed on the display 18. If true, the UI control module 114 sets the selection 140 for the audio manager module 110.

The UI control module 114 also processes the user input data 146 to determine whether the user input data 146 is a non-verbal communication. If true, the UI control module 114 sets the non-verbal communication data 118 for the communication processing module 102.

The UI control module 114 also receives as input the retrieved audio data 142. Based on the retrieved audio data 142, the UI control module 114 outputs audio data 148 to the audio device 16. The audio data 148 comprises one or more audio signals to be broadcast by the audio device 16 based on the retrieved audio data 142. In the example of the retrieved audio data 142 being based on non-verbal data 123, the audio data 148 comprises one or more audio signals generated by a mere read out of the non-verbal data 123.

Figure 4:
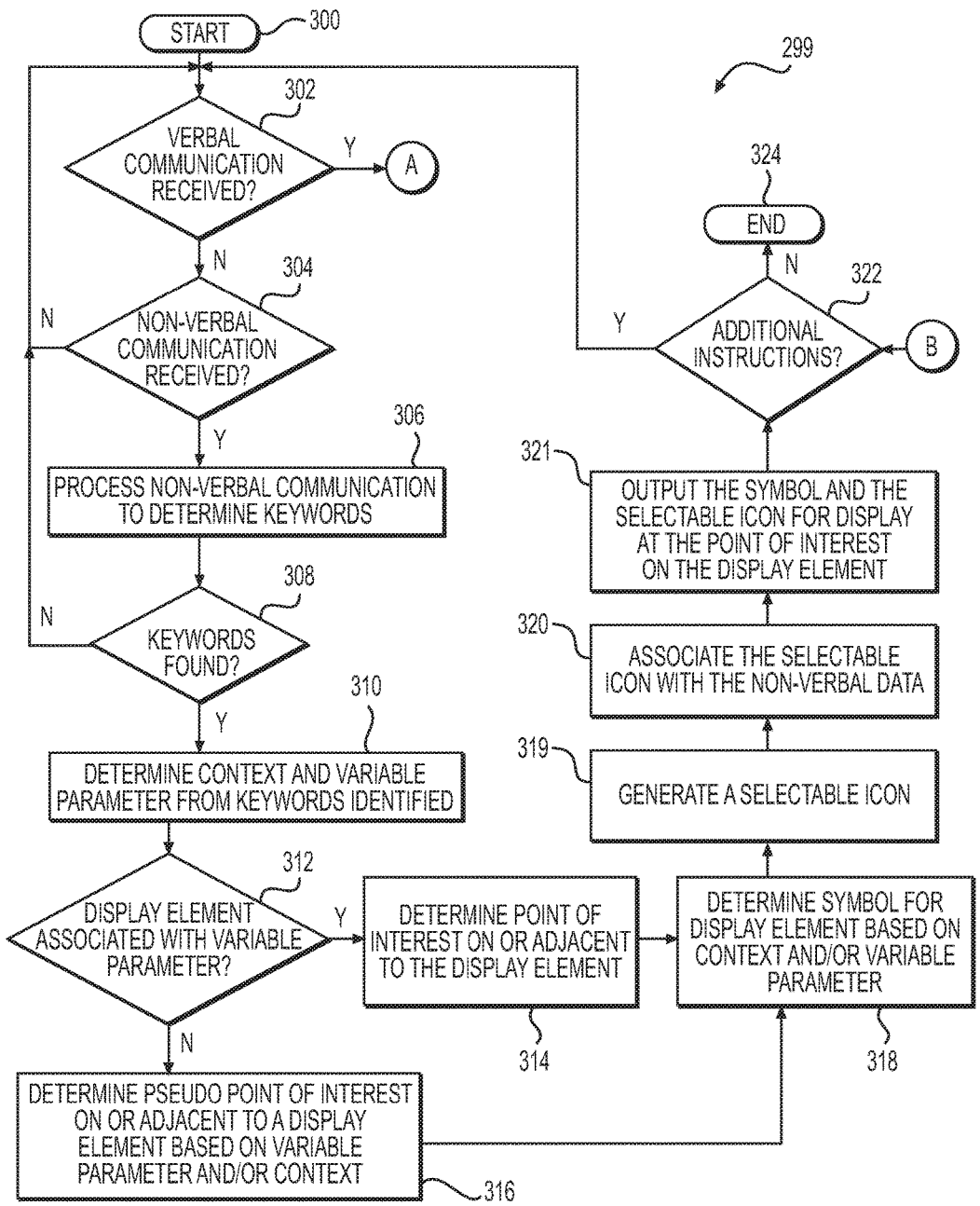
FIG. 4 is a flowchart illustrating a control method of the contextual tagging system of FIG. 1 in accordance with various embodiments.
Figure 5:
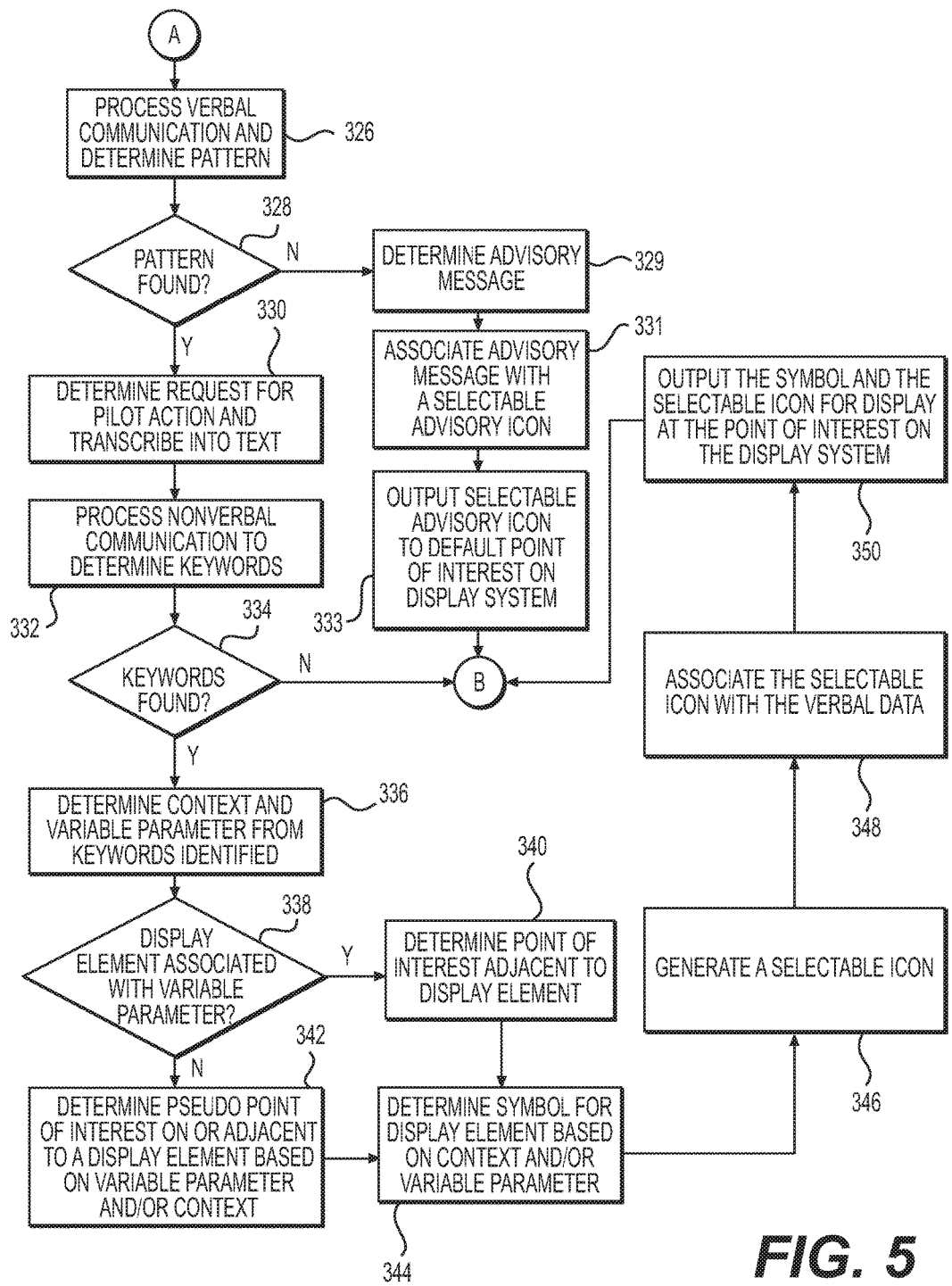
FIG. 5 is a continuation of the flowchart of FIG. 4.

Referring now to FIGS. 4 and 5, and with continued reference to FIGS. 1-3, a flowchart illustrates a control method 299 that can be performed by the contextual tagging control module 24 of FIGS. 1-3 in accordance with the present disclosure. As can be appreciated in light of the disclosure, the order of operation within the method is not limited to the sequential execution as illustrated in FIGS. 4 and 5 but may be performed in one or more varying orders as applicable and in accordance with the present disclosure.

In various embodiments, the method can be scheduled to run periodically or based on predetermined events, such as based on the receipt of verbal communication data 116, user input data 146 or CPDLC data 120.

The method begins at 300. At 302, the method determines whether the verbal communication data 116 has been received via the radio communication system 28. If true, the method proceeds to A on FIG. 5. Otherwise, at 304, the method determines whether non-verbal communication has been received, such as the non-verbal communication data 118 received via the user input device 14 or the CPDLC data 120 received via the data link system 26. If true, the method proceeds to 306. Otherwise, the method loops.

At 306, the method processes the non-verbal communication (e.g. the non-verbal communication data 118 or the CPDLC data 120) and queries the instruction keyword datastore 208. At 308, the method determines whether one or more keywords 212 are identified or found in the non-verbal communication (e.g. the non-verbal communication data 118 or the CPDLC data 120). If true, the method proceeds to 310. Otherwise, the method loops to 302. Optionally, the method can end.

At 310, the method determines the context 122 and the variable parameter 124 based on the keywords identified in the non-verbal communication (e.g. the non-verbal communication data 118 or the CPDLC data 120). At 312, the method queries the display element datastore 108 and determines whether one or more display elements 128 are associated with the variable parameter 124. If true, the method proceeds to 314. If false, at 316, the method determines a pseudo point of interest on or adjacent to one of the display elements 128 based on the context 122 and/or the variable parameter 124.

At 314, the method determines a point of interest on or adjacent to the one or more display elements 128 based on the variable parameter 124. At 318, the method determines the symbol 130 for display on the display element 128 based on the context 122 and/or the variable parameter 124. At 319, the method generates the selectable icon 138 based on the received non-verbal communication data 118 received from the user input devices 14 or CPDLC data 120 received from the communications system 12. At 320, the method associates the selectable icon 138 with the received non-verbal data 123. At 321, the method outputs the symbol 130 and the selectable icon 138 for display on the display 18 at the determined point of interest on or adjacent to the one or more display elements 128. Generally, the symbol 130 is displayed at the point of interest so as to be superimposed over a portion of the rendered display at the point of interest. At 322, the method determines whether additional instructions have been received (e.g. determines whether additional non-verbal communications (e.g. the non-verbal communication data 118 or the CPDLC data 120) and/or verbal communication data 116 has been received. If true, the method loops to 302. Otherwise, the method ends at 324.

With reference to FIG. 5, from A, at 326, the method processes the verbal communication data 116 and queries the pattern datastore 204 to determine the pattern 209. At 328, the method determines whether one of the patterns 209 matches or is found for the verbal communication data 116. If true, the method proceeds to 330. Otherwise, at 329, the method determines the verbal communication data 116 is an advisory message. At 331, the method assocaiates the advisory message or advisory verbal data 127 with a selectable advisory icon 139. At 333, the method outputs the selectable advisory icon 139 for display on the display 18 at a default or predefined point of interest on the display 18. Generally, the selectable advisory icon 139 is displayed at the default point of interest so as to be superimposed over a portion of the rendered display at the default point of interest. The method proceeds to B on FIG. 4.

At 330, based on the identified pattern 209, the method determines the request for pilot action and transcribes the request for pilot action into text. At 332, the method processes the transcribed text and queries the instruction keyword datastore 208. At 334, the method determines whether one or more one or more keywords 212 are identified or found in the transcribed text. If true, the method proceeds to 336. Otherwise, the method proceeds to B on FIG. 4. Optionally, the method can end.

At 336, the method determines the context 122 and the variable parameter 124 based on the keywords identified in the transcribed text of the verbal communication data 116. At 338, the method queries the display element datastore 108 and determines whether one or more display elements 128 are associated with the variable parameter 124. If true, the method proceeds to 340. If false, at 342, the method determines a pseudo point of interest on or adjacent to one of the display elements 128 based on the context 122 and/or the variable parameter 124.

At 340, the method determines a point of interest on or adjacent to the one or more display elements 128 based on the variable parameter 124. At 344, the method determines the symbol 130 for display on the display element 128 based on the context 122 and/or the variable parameter 124. At 346, the method generates the selectable icon 138 based on the received verbal communication data 116 received from the communications system 12. At 348, the method associates the selectable icon 138 with the received verbal data 126. At 350, the method outputs the symbol 130 and the selectable icon 138 for display on the display 18 at the determined point of interest on or adjacent to the one or more display elements 128. Generally, the symbol 130 and the selectable icon 138 are displayed at the point of interest so as to be superimposed over a portion of the rendered display at the point of interest. The method proceeds to B on FIG. 4.

Figure 6:
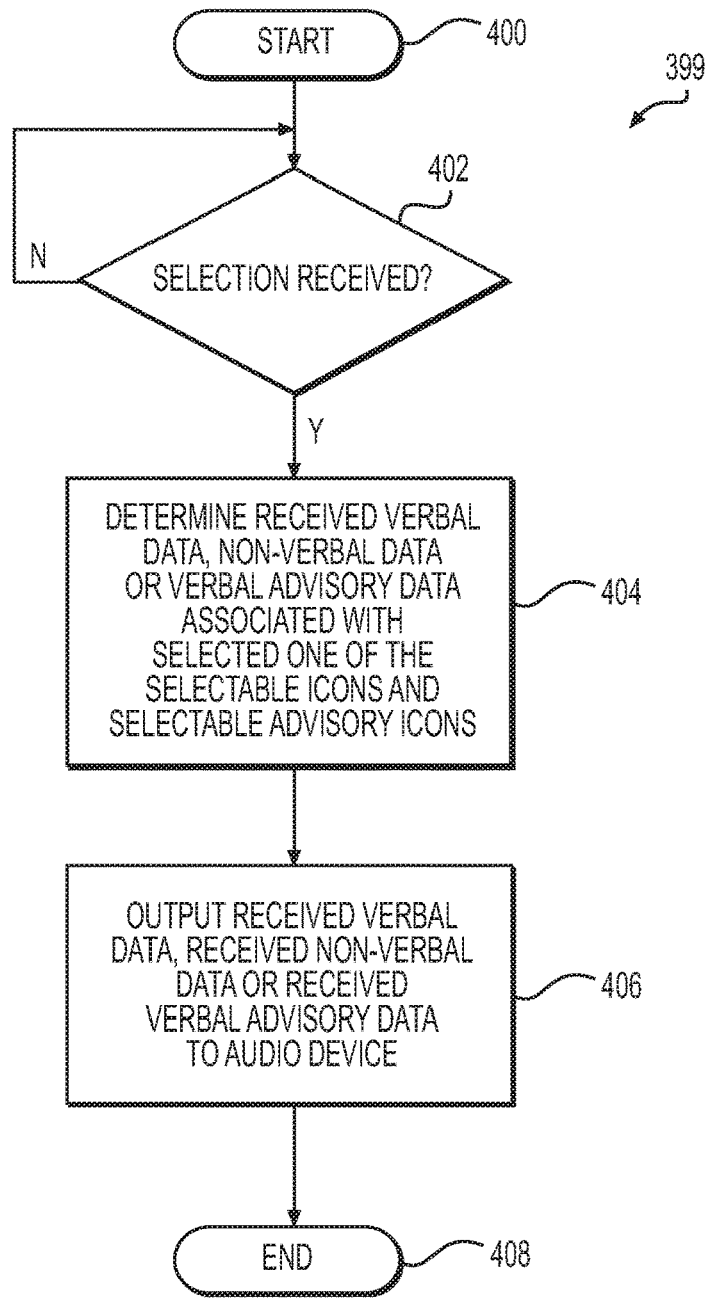
FIG. 6 is a flowchart illustrating a control method of the contextual tagging system of FIG. 1 in accordance with various embodiments.

Referring now to FIG. 6, and with continued reference to FIGS. 1-3, a flowchart illustrates a control method 399 that can be performed by the contextual tagging control module 24 of FIGS. 1-3 in accordance with the present disclosure. As can be appreciated in light of the disclosure, the order of operation within the method is not limited to the sequential execution as illustrated in FIG. 6 but may be performed in one or more varying orders as applicable and in accordance with the present disclosure.

In various embodiments, the method can be scheduled to run periodically or based on predetermined events, such as based on the receipt of user input data 146.

The method begins at 400. At 402, the method determines whether the selection 140 has been received via the user input device 14. If true, the method proceeds to 404. Otherwise, the method loops.

At 404, the method queries the audio associations datastore 112 to determine the received verbal data 126, received non-verbal data 123 or the received advisory verbal data 127 associated with the selected one of the selectable icons 138 and selectable advisory icons 139. At 406, the method outputs the received verbal data 126, the received non-verbal data 123 or the received advisory verbal data 127 as the audio data 148 for the audio device 16. The method ends at 408.

Figure 7:
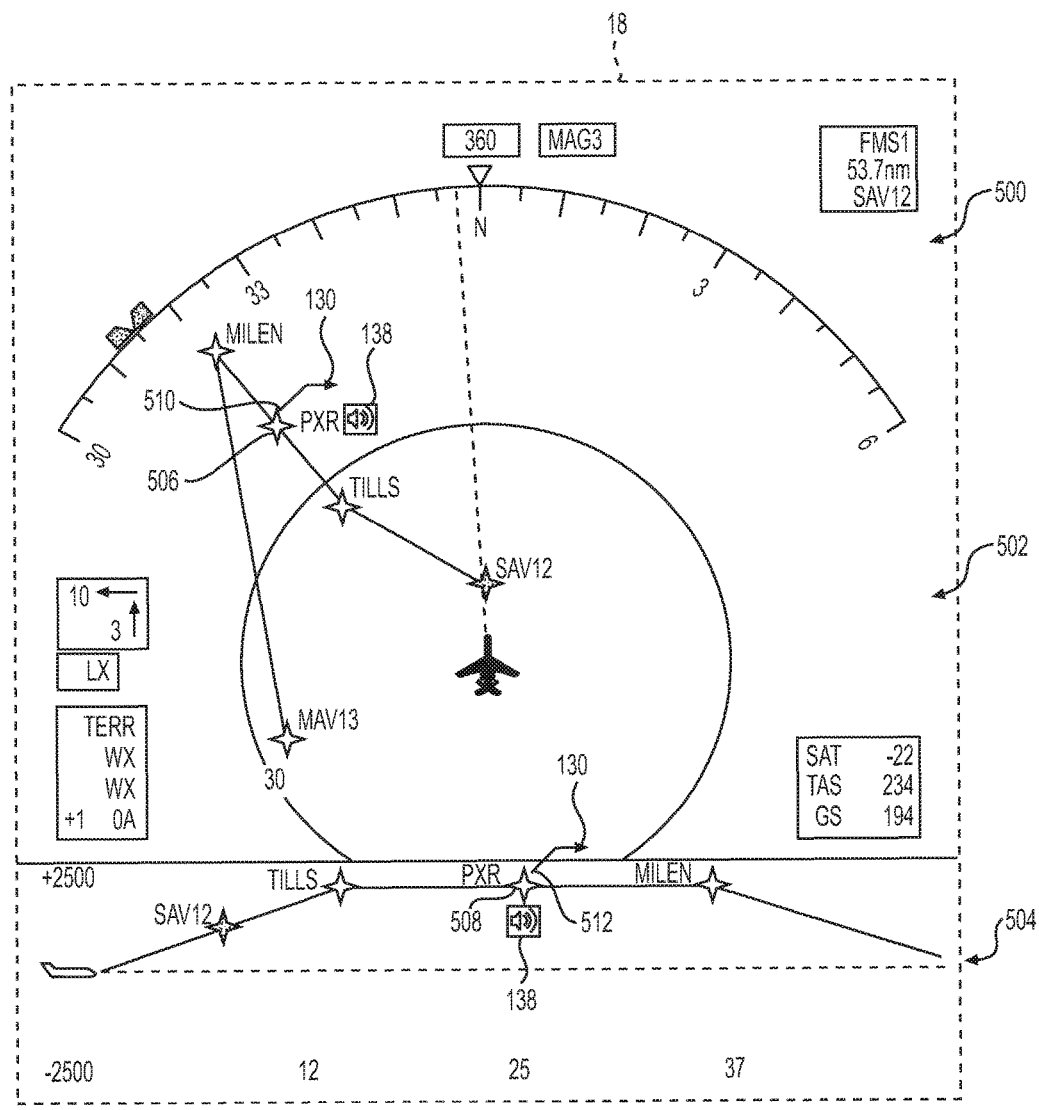
FIG. 7 is an illustration of one exemplary user interface generated by the contextual tagging system of FIG. 1, which displays a symbol and a selectable icon adjacent to a display element on the display of the vehicle based on an exemplary received verbal communication in accordance with various embodiments.

With reference to FIG. 7, an exemplary user interface 500 rendered on the display 18 by the contextual tagging control module 24 of the processing system 22 and the display system 30 is shown. In this example, the user interface 500 includes an interactive navigational display 502 and a vertical situation display 504. The interactive navigational display 502 and the vertical situation display 504 are each generated or rendered by the display system 30 and/or processing system 22 based on the operating status of the aircraft 10, as received from the navigation system 32, the avionics system 34 and the flight management system 36. In this example, the verbal communication data 116 is "Climb to FL300 after crossing the Phoenix VOR," which is received as input from the radio communication system 28.

Based on the received verbal communication data 116, the contextual tagging control module 24 determines the pattern 209 associated with the received verbal communication data 116. In this example, the instruction word is "climb" and the value words are "FL300" and "Phoenix VOR." Based on the determination that this verbal communication data 116 matches one of the patterns 209 for a request for pilot action, the contextual tagging control module 24 determines the request for pilot action based on the pattern. The contextual tagging control module 24 transcribes the verbal communication data 116 and generates the transcription data 210. Based on the transcription data 210, the contextual tagging control module 24 queries the instruction keyword datastore 208 and determines whether one or more keywords 212 match with the transcription data 210. In this example, the contextual tagging control module 24 identifies the keywords "climb," "FL300," and "Phoenix VOR." The contextual tagging control module 24 sets the context 122 as "climb" and sets the variable parameter 124 as "FL300" and "Phoenix VOR." The contextual tagging control module 24 queries the display element datastore 108, and retrieves the display elements 128 associated with "FL300" and "Phoenix VOR." As shown in FIG. 7, interactive navigational display 502 includes the display element 128 of a waypoint PXR 506 and the vertical situation display 504 includes the display element 128 of a waypoint PXR 508. The contextual tagging control module 24 determines a respective point of interest 510, 512 based on the variable parameter value of "Phoenix VOR" for the output of the symbol 130 and the selectable icon 138 as adjacent to the waypoint PXR on the interactive navigational display 502 and the vertical situation display 504.

The contextual tagging control module 24 queries the symbol datastore 106 and retrieves the symbol 130 associated with the context 122 of "climb." In one example, this symbol 130 is a graphical representation of a slanted upward pointing arrow. The contextual tagging control module 24 generates the selectable icon 138 based on the verbal data 126 from the verbal communication data 116, and associates the selectable icon 138 with the verbal data 126. The contextual tagging control module 24 outputs the symbol 130, the selectable icon 138 and the point of interest data 134 as the UI data 144 for the display 18, as shown in FIG. 7. Upon selection of the selectable icon 138 via the user input device 14, the contextual tagging control module 24 outputs the audio data 148 to the audio device 16 to playback "Climb to FL300 after crossing the Phoenix VOR."

Figure 8:
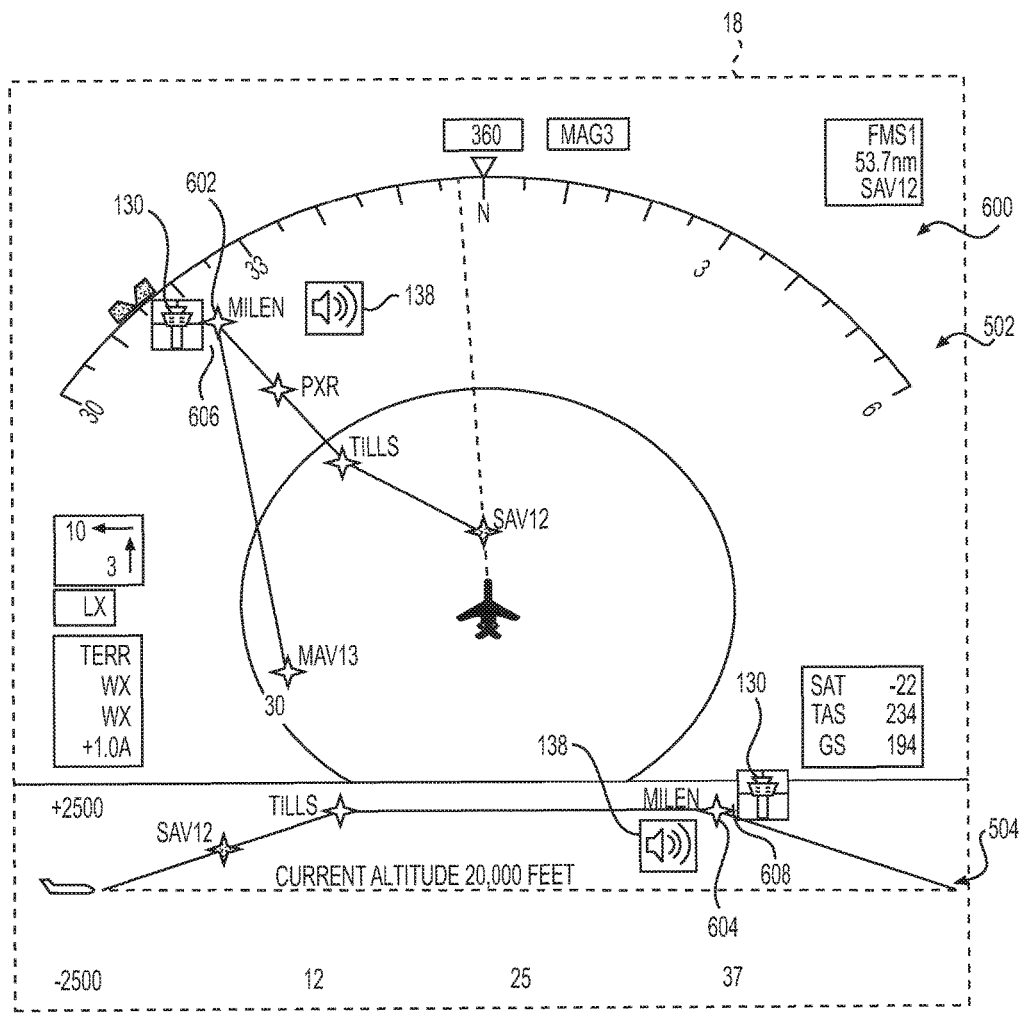
FIG. 8 is an illustration of one exemplary user interface generated by the contextual tagging system of FIG. 1, which displays a symbol and a selectable icon adjacent to a display element on the display of the vehicle based on another exemplary received verbal communication in accordance with various embodiments.

With reference to FIG. 8, an exemplary user interface 600 rendered on the display 18 by the contextual tagging control module 24 of the processing system 22 and the display system 30 is shown. In this example, the user interface 600 includes the interactive navigational display 502 and the vertical situation display 504, as discussed with regard to FIG. 7. In this example, the verbal communication data 116 is "Report crossing Milen," which is received as input from the radio communication system 28.

Based on the received verbal communication data 116, the contextual tagging control module 24 determines the pattern 209 associated with the received verbal communication data 116. In this example, the instruction word is "Report" and the value words are "Milen." Based on the determination that this verbal communication data 116 matches one of the patterns 209 for a request for pilot action, the contextual tagging control module 24 determines the request for pilot action based on the pattern. The contextual tagging control module 24 transcribes the verbal communication data 116 and generates the transcription data 210. Based on the transcription data 210, the contextual tagging control module 24 queries the instruction keyword datastore 208 and determines whether one or more keywords 212 match with the transcription data 210. In this example, the contextual tagging control module 24 identifies the keywords "report" and "Milen." The contextual tagging control module 24 sets the context 122 as "report" and sets the variable parameter 124 as "Milen." The contextual tagging control module 24 queries the display element datastore 108, and retrieves the display elements 128 associated with "Milen." As shown in FIG. 8, the interactive navigational display 502 includes the display element 128 of a waypoint Milen 602 and the vertical situation display 504 includes the display element 128 of a waypoint Milen 604. The contextual tagging control module 24 determines a respective point of interest 606, 608 for the output of the symbol 130 and the selectable icon 138 based on the variable parameter value of "Milen" as adjacent to the waypoint Milen on the interactive navigational display 502 and the vertical situation display 504.

The contextual tagging control module 24 queries the symbol datastore 106 and retrieves the symbol 130 associated with the context 122 of "report." In one example, this symbol 130 is a graphical representation of an air traffic control tower. The contextual tagging control module 24 generates the selectable icon 138 based on the verbal data 126 from the verbal communication data 116, and associates the selectable icon 138 with the verbal data 126. The contextual tagging control module 24 outputs the symbol 130, the selectable icon 138 and the point of interest data 134 as the UI data 144 for the display 18, as shown in FIG. 8. Upon selection of the selectable icon 138 via the user input device 14, the contextual tagging control module 24 outputs the audio data 148 to the audio device 16 to playback "Report crossing Milen."

Figure 9:
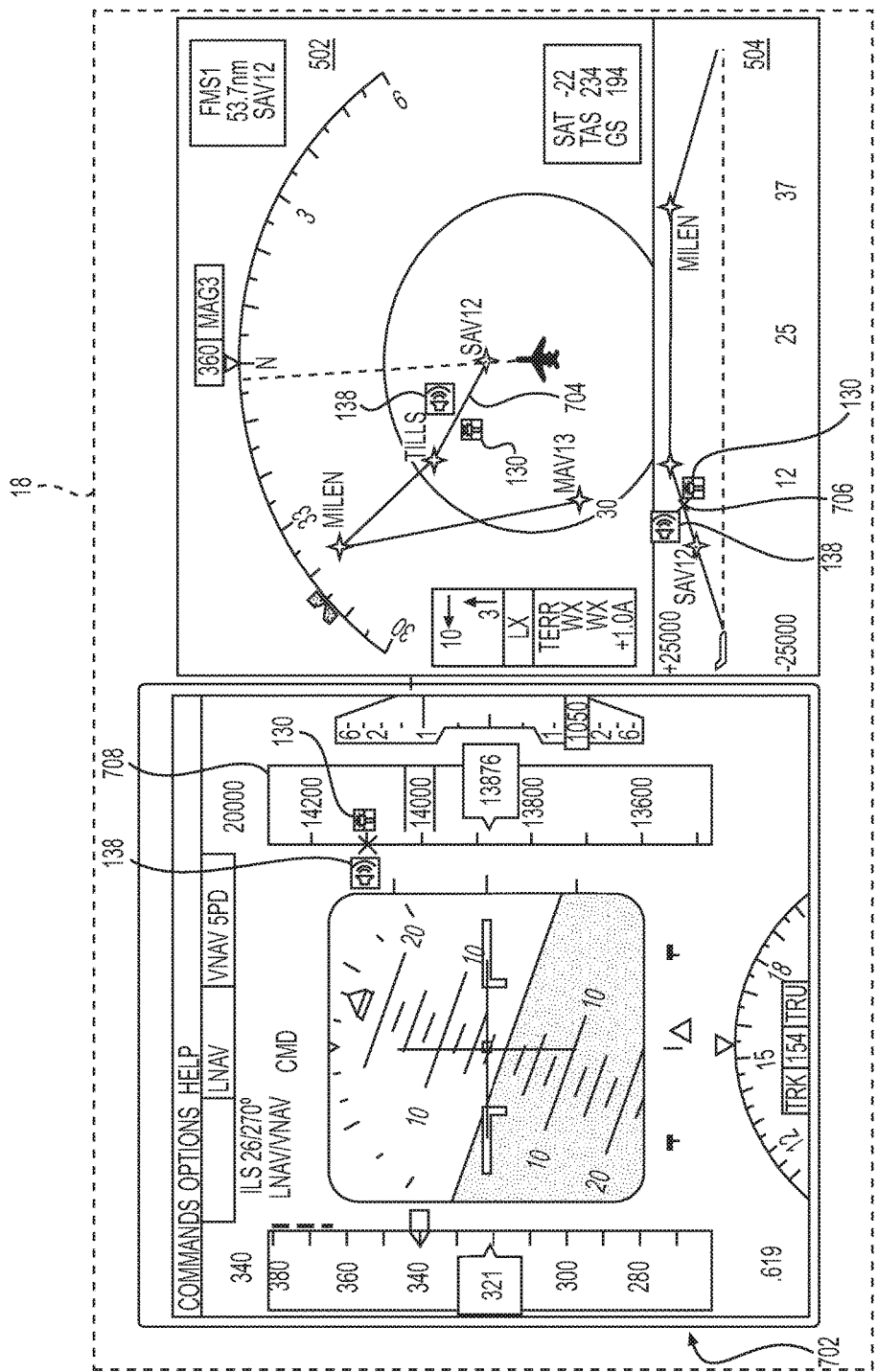
FIG. 9 is an illustration of one exemplary user interface generated by the contextual tagging system of FIG. 1, which displays a symbol and a selectable icon adjacent to a display element on the display of the vehicle based on another exemplary received verbal communication in accordance with various embodiments.

With reference to FIG. 9, an exemplary user interface 700 rendered on the display 18 by the contextual tagging control module 24 of the processing system 22 and the display system 30 is shown. In this example, the user interface 700 includes the interactive navigational display 502, the vertical situation display 504, as discussed with regard to FIG. 7, and a left primary flight display 702. The left primary flight display 702 is generated or rendered by the display system 30 and/or processing system 22 based on the operating status of the aircraft 10, as received from the navigation system 32, the avionics system 34 and the flight management system 36. The interactive navigational display 502, the vertical situation display 504 and the left primary flight display 702 may be rendered on the same display 18, or can be rendered on one or more displays 18. In this example, the verbal communication data 116 is "Report crossing altitude FL200," which is received as input from the radio communication system 28.

Based on the received verbal communication data 116, the contextual tagging control module 24 determines the pattern 209 associated with the received verbal communication data 116. In this example, the instruction word is "Report" and the value words are "altitude" and "FL200." Based on the determination that this verbal communication data 116 matches one of the patterns 209 for a request for pilot action, the contextual tagging control module 24 determines the request for pilot action based on the pattern. The contextual tagging control module 24 transcribes the verbal communication data 116 and generates the transcription data 210. Based on the transcription data 210, the contextual tagging control module 24 queries the instruction keyword datastore 208 and determines whether one or more keywords 212 match with the transcription data 210. In this example, the contextual tagging control module 24 identifies the keywords "report," "altitude" and "FL200." The contextual tagging control module 24 sets the context 122 as "report" and sets the variable parameter 124 as "altitude" and "FL200." The contextual tagging control module 24 queries the display element datastore 108, and retrieves the display elements 128 associated with "altitude" and "FL200." As shown in FIG. 9, the interactive navigational display 502 and the vertical situation display 504 do not include display elements 128 associated with the altitude FL200. The contextual tagging control module 24 determines a respective pseudo point of interest 704, 706 on or adjacent to one of the display elements 128 on the interactive navigational display 502 and the vertical situation display 504 based on the variable parameter of "altitude" and "FL200" and/or the context of "report." In this example, the contextual tagging control module 24 determines the respective pseudo point of interest 704, 706 as the point where the aircraft 10 should pass the altitude FL200, based on the variable parameter value of "altitude" and "FL200."

The left primary flight display 702 includes the display element of an altitude indicator 708. The contextual tagging control module 24 determines the point of interest on the display 18 as on the altitude indicator 708 at the value of "altitude FL200" based on the variable parameter value for the output of the symbol 130 and the selectable icon 138.

The contextual tagging control module 24 queries the symbol datastore 106 and retrieves the symbol 130 associated with the context 122 of "report." The contextual tagging control module 24 generates the selectable icon 138 based on the verbal data 126 from the verbal communication data 116, and associates the selectable icon 138 with the verbal data 126. The contextual tagging control module 24 outputs the symbol 130, the selectable icon 138 and the point of interest data 134 as the UI data 144 for the display 18, as shown in FIG. 9. Upon selection of the selectable icon 138 via the user input device 14, the contextual tagging control module 24 outputs the audio data 148 to the audio device 16 to playback "Report crossing altitude FL200."

In another example, with reference to FIG. 10, an exemplary user interface 800 rendered on the display 18 by the contextual tagging control module 24 of the processing system 22 and the display system 30 is shown. In this example, the user interface 800 includes the interactive navigational display 502 and the vertical situation display 504, as discussed with regard to FIG. 7. In this example, the verbal communication data 116 is "Vectoring heading to 200 degrees at waypoint Milen," which is received as input from the radio communication system 28.

Based on the received verbal communication data 116, the contextual tagging control module 24 determines the pattern 209 associated with the received verbal communication data 116. In this example, the instruction words are "vectoring heading" and the value words are "200 degrees" and "Milen." Based on the determination that this verbal communication data 116 matches one of the patterns 209 for a request for pilot action, the contextual tagging control module 24 determines the request for pilot action based on the pattern. The contextual tagging control module 24 transcribes the verbal communication data 116 and generates the transcription data 210. Based on the transcription data 210, the contextual tagging control module 24 queries the instruction keyword datastore 208 and determines whether one or more keywords 212 match with the transcription data 210. In this example, the contextual tagging control module 24 identifies the keywords "vectoring," "heading," "200 degrees" and "Milen." The contextual tagging control module 24 sets the context 122 as "vectoring" and sets the variable parameter 124 as "heading," "200 degrees" and "Milen." The contextual tagging control module 24 queries the display element datastore 108, and retrieves the display elements 128 associated with "heading," "200 degrees" and "Milen." As shown in FIG. 10, the interactive navigational display 502 includes the display element 128 of the waypoint Milen 602 and the vertical situation display 504 includes the display element 128 of the waypoint Milen 604. The contextual tagging control module 24 determines a respective point of interest 802, 804 (i.e. point of interest data 134) for the output of the symbol 130 and the selectable icon 138 based on the variable parameter value of "Milen" as adjacent to the waypoint Milen on the interactive navigational display 502 and the vertical situation display 504.

The contextual tagging control module 24 queries the symbol datastore 106 and retrieves the symbol 130 associated with the context 122 of "vectoring." In one example, this symbol 130 is a graphical representation of a compass with an arrow. The contextual tagging control module 24 generates the selectable icon 138 based on the verbal data 126 from the verbal communication data 116, and associates the selectable icon 138 with the verbal data 126. The contextual tagging control module 24 outputs the symbol 130, the selectable icon 138 and the point of interest data 134 as the UI data 144 for the display 18, as shown in FIG. 8. Upon selection of the selectable icon 138 via the user input device 14, the contextual tagging control module 24 outputs the audio data 148 to the audio device 16 to playback "vectoring heading to 200 degrees at waypoint Milen."

In a further example, with reference to FIG. 11, an exemplary user interface 900 rendered on the display 18 by the contextual tagging control module 24 of the processing system 22 and the display system 30 is shown. In this example, the user interface 900 includes the interactive navigational display 502 and the vertical situation display 504, as discussed with regard to FIG. 7. In this example, the verbal communication data 116 is "At time 16:00:00 descent to 20000 feet," which is received as input from the radio communication system 28.

Based on the received verbal communication data 116, the contextual tagging control module 24 determines the pattern 209 associated with the received verbal communication data 116. In this example, the instruction word is "descent" and the value words are "time 16:00:00" and "20000 feet." Based on the determination that this verbal communication data 116 matches one of the patterns 209 for a request for pilot action, the contextual tagging control module 24 determines the request for pilot action based on the pattern. The contextual tagging control module 24 transcribes the verbal communication data 116 and generates the transcription data 210. Based on the transcription data 210, the contextual tagging control module 24 queries the instruction keyword datastore 208 and determines whether one or more keywords 212 match with the transcription data 210. In this example, the contextual tagging control module 24 identifies the keywords "time," "16:00:00," "descent," and "20000 feet." The contextual tagging control module 24 sets the context 122 as "descent" and sets the variable parameter 124 as "time," "16:00:00" and "20000 feet." The contextual tagging control module 24 queries the display element datastore 108, and retrieves the display elements 128 associated with "time," "16:00:00" and "20000 feet." As shown in FIG. 11, the interactive navigational display 502 and the vertical situation display 504 generally do not include a time display, and thus, the contextual tagging control module 24 determines a respective pseudo point of interest 902, 904 based on the variable parameter value of "16:00:00." In this example, the pseudo point of interest 902, 904 is determined based on flight plan data retrieved from the flight plan datastore 40, which indicates the position of the aircraft 10 based on the flight plan for the aircraft 10 at time 16:00:00.

The contextual tagging control module 24 queries the symbol datastore 106 and retrieves the symbol 130 associated with the context 122 of "descent." In one example, this symbol 130 is a graphical representation of a slanted downward pointing arrow. The contextual tagging control module 24 generates the selectable icon 138 based on the verbal data 126 from the verbal communication data 116, and associates the selectable icon 138 with the verbal data 126. The contextual tagging control module 24 outputs the symbol 130, the selectable icon 138 and the point of interest data 134 as the UI data 144 for the display 18, as shown in FIG. 11. Upon selection of the selectable icon 138 via the user input device 14, the contextual tagging control module 24 outputs the audio data 148 to the audio device 16 to playback "At time 16:00:00 descent to 20000 feet."

Thus, the system and method for contextual tagging of communications, such as verbal and non-verbal communications on a vehicle display, such as a display associated with an aircraft, reduces pilot workload and may reduce misinterpretations. By generating and outputting the symbol 130 and the selectable icon 138, the verbal or non-verbal communication is tagged on the display 18 at the point of interest in which the verbal or non-verbal communication is relevant. In addition, the contextual tagging control module 24 described herein can also generate and output one or more alerts when the aircraft 10 is determined to be within a threshold proximity to a requested pilot action, which can alert or remind the pilot and/or copilot of the requested pilot action. Moreover, the contextual tagging control module 24 described herein can also display the tags (symbol 130 and the selectable icon 138) such that the most relevant and upcoming tags are displayed on the display 18, thereby reducing clutter on the display.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for contextual tagging of data on at least one display associated with a vehicle, comprising:
   receiving data regarding the vehicle from a source of verbal data;
   comparing, by a processor, the data to one or more instruction keywords to determine a context associated with the data and a variable parameter associated with the context, the variable parameter having a value;
   querying, by the processor, a listing of display elements currently displayed on the at least one display and determining, by the processor, a display element from the listing of display elements that corresponds to the determined variable parameter;
   generating, by the processor, a symbol for the display to display adjacent to the display element that is currently displayed on the at least one display based on at least one of the determined context and the determined variable parameter;
   determining, by the processor, a position for the display of the symbol adjacent to the display element that is currently displayed on the at least one display based on the value of the variable parameter;
   generating, by the processor, a selectable icon for the display to render adjacent to the symbol based on received verbal data;
   associating, by the processor, the received verbal data to the selectable icon; and
   outputting the received verbal data to an audio device based on a selection of the selectable icon.

2. The method of claim 1, wherein the source of verbal data is a radio communication system.

3. The method of claim 1, further comprising receiving data regarding the vehicle from a source of non-verbal data, wherein the source of non-verbal data is at least one of a user input device associated with the vehicle or a data link system associated with the vehicle.

4. The method of Claim 3, wherein the comparing, by the processor, the data to one or more instruction keywords further comprises:
   identifying, by the processor, one or more keywords in the non-verbal data; and
   determining, by the processor, the context and the variable parameter based on the identified keywords.

5. The method of claim 1, wherein the comparing, by the processor, the data to one or more instruction keywords further comprises:
   transcribing, by the processor, the data received from the source of verbal data that includes a request for pilot action;
   identifying, by the processor, one or more keywords from the transcribed data;
   determining, by the processor, the context and the variable parameter based on the identified keywords.

6. The method of claim 1, wherein the vehicle is an aircraft, and the context is a requested pilot action.

7. A contextual tagging system for contextually tagging data on at least one display associated with a vehicle, comprising:
   a source of verbal data associated with the vehicle;
   a source of display element data that provides a plurality of display elements associated with the at least one display that are currently displayed on the at least one display; and
   a processor associated with the vehicle, the processor in communication with the source of verbal data and the source of display element data, and the processor:
   receives the verbal data;
   compares the verbal data to one or more instruction keywords and determines a context associated with the verbal data;
   determines a variable parameter associated with the context, the variable parameter having a value;
   queries the source of display element data and determines whether at least one of the plurality of display elements currently displayed on the at least one display is associated with the variable parameter;
   generates a symbol for the at least one display to display adjacent to the determined at least one of the plurality of display elements based on the variable parameter;
   based on the determination that at least one of the plurality of display elements currently displayed on the at least one display is associated with the variable parameter, determines a position for the display of the symbol adjacent to the at least one of the plurality of display elements based on the value of the variable parameter;
   generates a selectable icon for the at least one display to display adjacent to the symbol based on received verbal data;
   associates the received verbal data to the selectable icon; and
   outputs the received verbal data to an audio device based on a selection of the selectable icon.

8. The contextual tagging system of claim 7, wherein the at least one source of verbal data is a communication system associated with the vehicle.

9. The contextual tagging system of claim 7, further comprising a source of non-verbal data associated with the vehicle, the processor receives the non-verbal data and the processor determines the context associated with the non-verbal data by identifying one or more keywords in the non-verbal communication, and determines the context and the variable parameter based on the identified keywords.

10. The contextual tagging system of Claim 9, wherein the at least one source of non-verbal data is selected from the group comprising a data link system, a user input device and combinations thereof.

11. The contextual tagging system of claim 7, wherein the processor determines the context associated with the verbal data by transcribing the verbal data, the verbal data including a request for pilot action, identifying one or more keywords from the transcribed data and the processor determines the context and the variable parameter based on the identified keywords.

12. The contextual tagging system of claim 7, wherein based on a determination that at least one of the plurality of display elements is unassociated with the determined variable parameter, the processor determines a position for the display of the symbol on the at least one display based on the variable parameter.

13. The contextual tagging system of claim 7, wherein the vehicle is an aircraft, and the context is a requested pilot action.

14. An aircraft, comprising:
   a communication system that receives at least a verbal communication;
   a display onboard the aircraft having a plurality of display elements associated with the display;
   a processor that contextually tags data on the display, the processor in communication with the communication system and the display, and the processor:

receives the verbal communication;

determines a pattern associated with the verbal communication;

compares the pattern to one or more instruction keywords to extract a context and a variable parameter associated with the context, the variable parameter having a value;

queries a listing of display elements currently displayed on the display and determines whether at least one of the plurality of display elements displayed on the display is associated with the variable parameter;

generates a symbol for the display to display adjacent to the determined at least one of the plurality of display elements currently displayed on the display based on at least one of the variable parameter and the context;

based on the determination that at least one of the plurality of display elements currently displayed on the display is associated with the variable parameter, determines a position for the display of the symbol adjacent to the at least one of the plurality of display elements based on the value of the variable parameter;

generates a selectable icon for the display to display adjacent to the symbol based on received verbal data;

associates the received verbal data to the selectable icon; and outputs the received verbal data to an audio device based on a selection of the selectable icon.

15. The aircraft of claim 14, wherein the processor determines the context associated with the verbal data by transcribing the verbal communication, the verbal communication including a request for pilot action, identifying one or more keywords from the transcribed data and the processor determines the context and the variable parameter based on the identified keywords.

16. The aircraft of claim 14, wherein based on a determination that at least one of the plurality of display elements is unassociated with the variable parameter, the processor determines a position for the display of the symbol based on the variable parameter.

17. The aircraft of claim 14, wherein the context is a pilot action.

* * * * *